(12) United States Patent
Chae

(10) Patent No.: US 10,594,992 B2
(45) Date of Patent: Mar. 17, 2020

(54) DIGITAL DEVICE, AND SYSTEM AND METHOD FOR CONTROLLING COLOR USING SAME

(71) Applicant: LG ELECTRONICS INC., Seoul (KR)

(72) Inventor: Myoungsuk Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/068,358

(22) PCT Filed: Aug. 18, 2016

(86) PCT No.: PCT/KR2016/009105
§ 371 (c)(1),
(2) Date: Jul. 5, 2018

(87) PCT Pub. No.: WO2017/119571
PCT Pub. Date: Jul. 13, 2017

(65) Prior Publication Data
US 2019/0014294 A1 Jan. 10, 2019

(30) Foreign Application Priority Data
Jan. 7, 2016 (KR) .................. 10-2016-0002160

(51) Int. Cl.
*H04N 9/31* (2006.01)
*H04N 9/68* (2006.01)
(Continued)

(52) U.S. Cl.
CPC ......... *H04N 9/3182* (2013.01); *G06F 3/1446* (2013.01); *G09G 5/02* (2013.01);
(Continued)

(58) Field of Classification Search
CPC ........... G09G 2320/08; G09G 2320/06; G09G 2320/0606; G09G 2320/0613;
(Continued)

(56) References Cited

U.S. PATENT DOCUMENTS 5,204,665 A * 4/1993 Bollman .................. G09G 5/02
345/593
6,025,823 A * 2/2000 Choi ...................... G09G 1/165
345/101

(Continued)

FOREIGN PATENT DOCUMENTS

| KR | 1020100029325 | 3/2010 |
| KR | 1020110058049 | 6/2011 |
| KR | 1020140077071 | 6/2014 |

OTHER PUBLICATIONS

PCT International Application No. PCT/KR2016/009105, Written Opinion of the International Searching Authority dated Nov. 16, 2016, 23 pages.

*Primary Examiner* — Jefferey F Harold
*Assistant Examiner* — Humam M Satti
(74) *Attorney, Agent, or Firm* — Lee, Hong, Degerman, Kang & Waimey

(57) ABSTRACT

The present invention relates to a digital device digital device may comprise: an input unit; a display unit; and a control unit for displaying a color gain adjustment window on the display unit according to a first input, extracting, when a certain color is selected in the color gain adjustment window, unique R, G, and B values of the selected color respectively, increasing or decreasing each of the extracted unique R, G, and B values according to a second input, increasing the gain value of the corresponding color when at least one of the increased unique R, G, and B values is equal to or greater than a first reference value, and decreasing the gain value of the corresponding color when at least one of
(Continued)

the decreased unique R, G, and B values is equal to or less than a second reference value.

19 Claims, 18 Drawing Sheets

(51) Int. Cl.
*H04N 9/73* (2006.01)
*H04N 9/12* (2006.01)
*G09G 5/02* (2006.01)
*G06F 3/14* (2006.01)
*H04N 9/71* (2006.01)

(52) U.S. Cl.
CPC ............. *H04N 9/12* (2013.01); *H04N 9/68* (2013.01); *H04N 9/71* (2013.01); *H04N 9/73* (2013.01); *G09G 2320/0606* (2013.01); *G09G 2320/0666* (2013.01); *G09G 2320/08* (2013.01)

(58) Field of Classification Search
CPC ..... G09G 2320/062; G09G 2320/0626; G09G 2320/0666; G09G 2320/0693; G09G 5/02; H04N 9/73; H04N 9/76; H04N 9/71; H04N 9/69; H04N 9/68; H04N 9/12; H04N 9/3182; H04N 9/3105; H04N 9/3111
See application file for complete search history.

(56) References Cited

U.S. PATENT DOCUMENTS

| | | | | |
|---|---|---|---|---|
| 6,034,665 | A * | 3/2000 | Kim | G06F 3/04897 345/593 |
| 6,653,991 | B1 * | 11/2003 | Kim | G09G 1/002 345/204 |
| 6,928,187 | B2 * | 8/2005 | Cooper | H04N 1/622 345/594 |
| 9,886,931 | B2 * | 2/2018 | Webb | G09G 5/02 |
| 2002/0163527 | A1 * | 11/2002 | Park | G09G 5/003 345/594 |
| 2005/0264762 | A1 * | 12/2005 | Cho | H04N 5/74 353/30 |
| 2006/0164442 | A1 * | 7/2006 | Furuhata | G09G 5/003 345/690 |
| 2006/0164513 | A1 * | 7/2006 | Sugiyama | H04N 9/73 348/180 |
| 2006/0214944 | A1 * | 9/2006 | Kim | G09G 5/02 345/594 |
| 2007/0030229 | A1 * | 2/2007 | Liu | G09G 3/20 345/90 |
| 2007/0139448 | A1 * | 6/2007 | Chen | G09G 3/2003 345/690 |
| 2007/0216772 | A1 * | 9/2007 | Xu | H04N 9/73 348/189 |
| 2007/0216918 | A1 * | 9/2007 | Honeck | B41F 31/045 358/1.9 |
| 2007/0229667 | A1 * | 10/2007 | Xu | H04N 9/73 348/189 |
| 2007/0273837 | A1 * | 11/2007 | Furui | G03B 37/00 353/31 |
| 2007/0285433 | A1 | 12/2007 | Wu et al. | |
| 2008/0024528 | A1 * | 1/2008 | Han | G02B 26/0808 345/690 |
| 2008/0127846 | A1 * | 6/2008 | Nagai | B41F 31/045 101/365 |
| 2009/0073181 | A1 * | 3/2009 | Choi | G09G 5/02 345/589 |
| 2009/0115431 | A1 * | 5/2009 | Philipp | G06F 3/044 324/686 |
| 2009/0153352 | A1 * | 6/2009 | Julio | H05B 33/0863 340/4.3 |
| 2009/0164905 | A1 * | 6/2009 | Ko | H04M 1/6016 715/727 |
| 2009/0167780 | A1 * | 7/2009 | Jung | G09G 3/2003 345/594 |
| 2010/0127638 | A1 * | 5/2010 | Lan | H05B 33/0863 315/294 |
| 2010/0277648 | A1 * | 11/2010 | Plut | G06F 1/3203 348/655 |
| 2010/0323671 | A1 * | 12/2010 | Jeong | G01J 3/02 455/414.1 |
| 2011/0181565 | A1 * | 7/2011 | Asamura | G01J 1/32 345/207 |
| 2011/0242127 | A1 * | 10/2011 | Knadler | G09G 5/02 345/589 |
| 2013/0006532 | A1 * | 1/2013 | Sudo | H04N 1/6033 702/1 |
| 2013/0106899 | A1 | 5/2013 | Bhatt | |
| 2013/0169662 | A1 * | 7/2013 | Yun | G09G 3/2003 345/589 |
| 2013/0307865 | A1 * | 11/2013 | Manabe | G01J 3/463 345/594 |
| 2014/0009485 | A1 * | 1/2014 | Asanuma | G09G 3/006 345/590 |
| 2014/0092117 | A1 * | 4/2014 | Yoshimura | G09G 5/02 345/589 |
| 2014/0181671 | A1 * | 6/2014 | Dewhurst | G06F 3/04847 715/722 |
| 2015/0042822 | A1 * | 2/2015 | Le | G03B 15/07 348/207.1 |
| 2015/0317944 | A1 * | 11/2015 | Safaee-Rad | G09G 5/02 345/595 |
| 2016/0165229 | A1 * | 6/2016 | Kao | H04N 17/04 348/189 |
| 2016/0365017 | A1 * | 12/2016 | Park | G09G 3/2003 |

* cited by examiner

FIG. 4
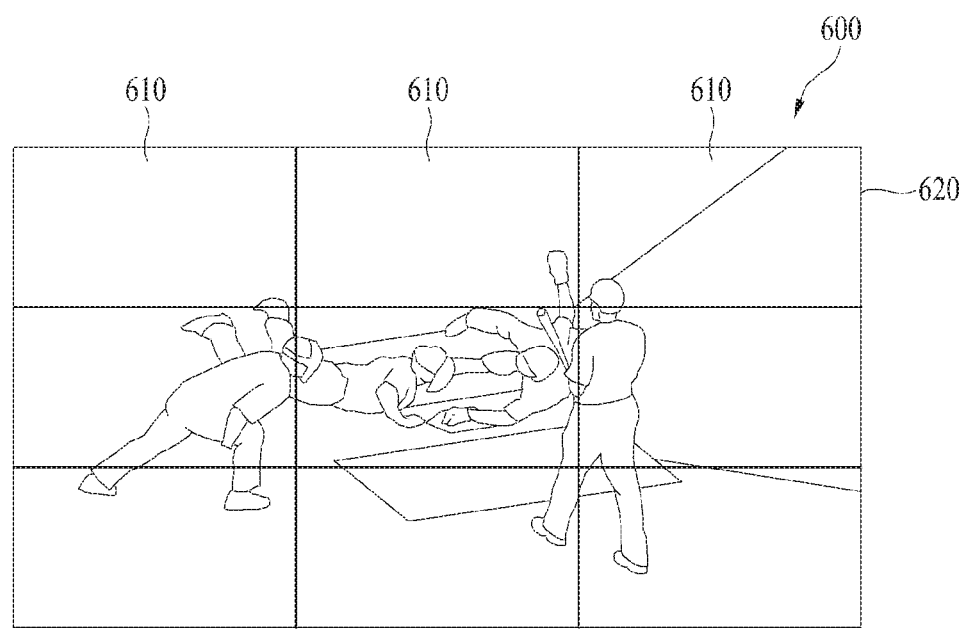
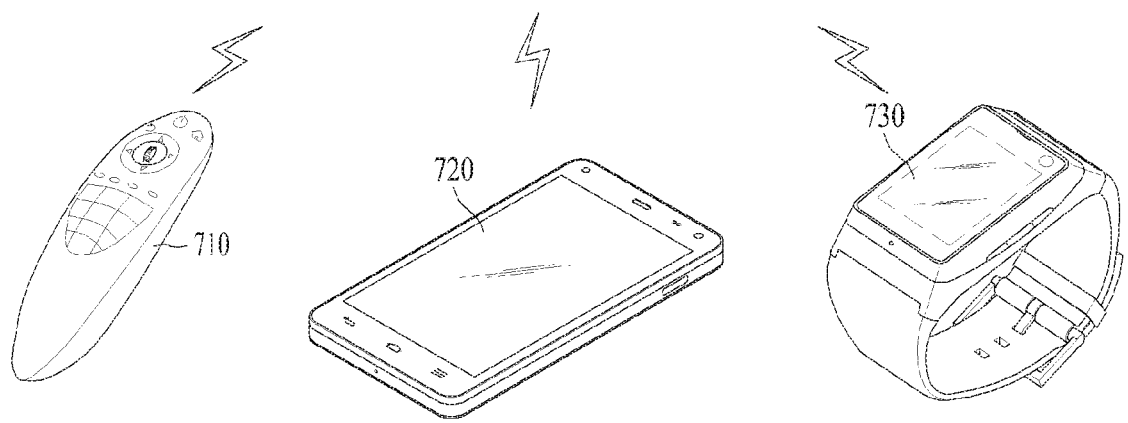

FIG. 9
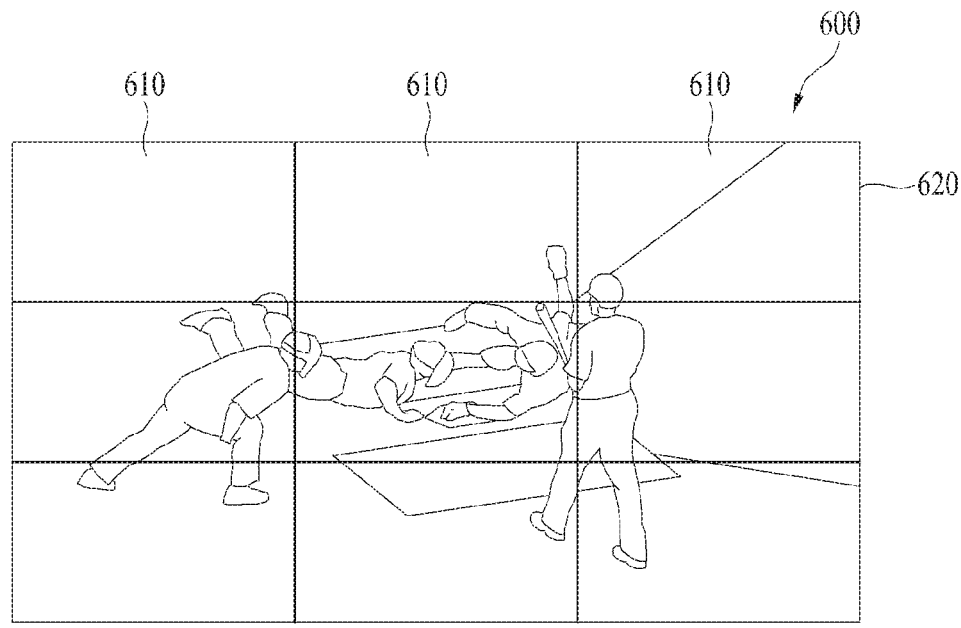
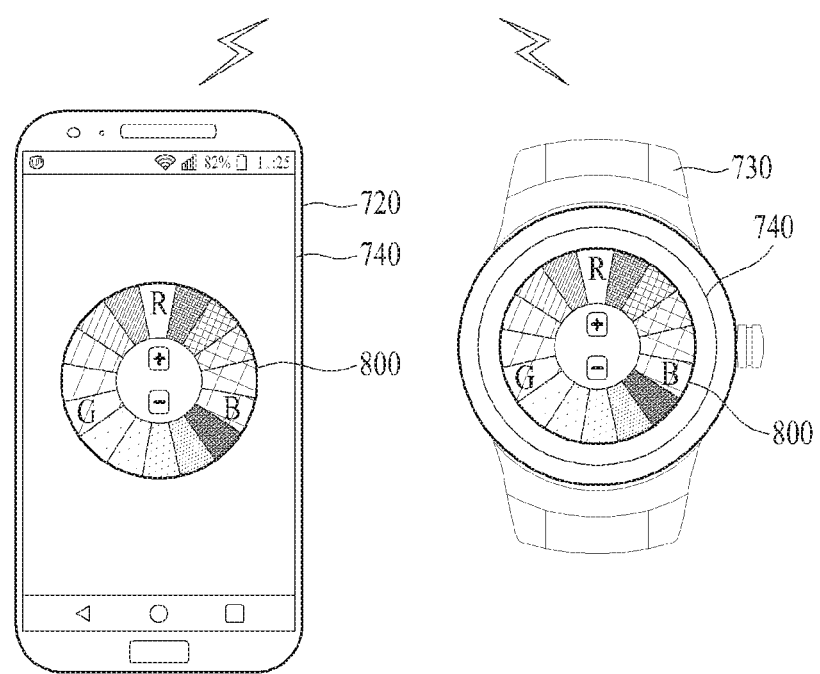

FIG. 14
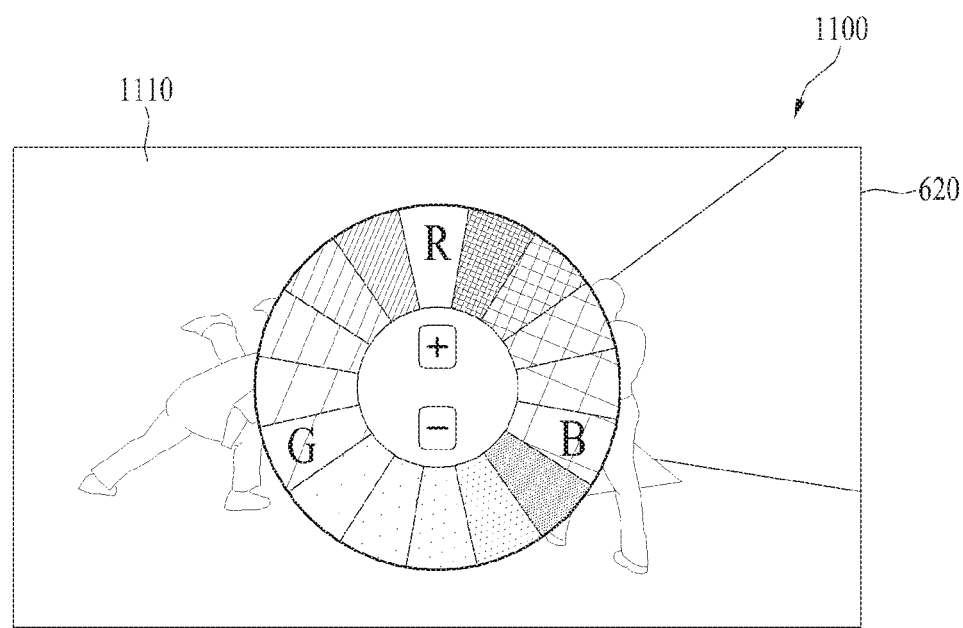
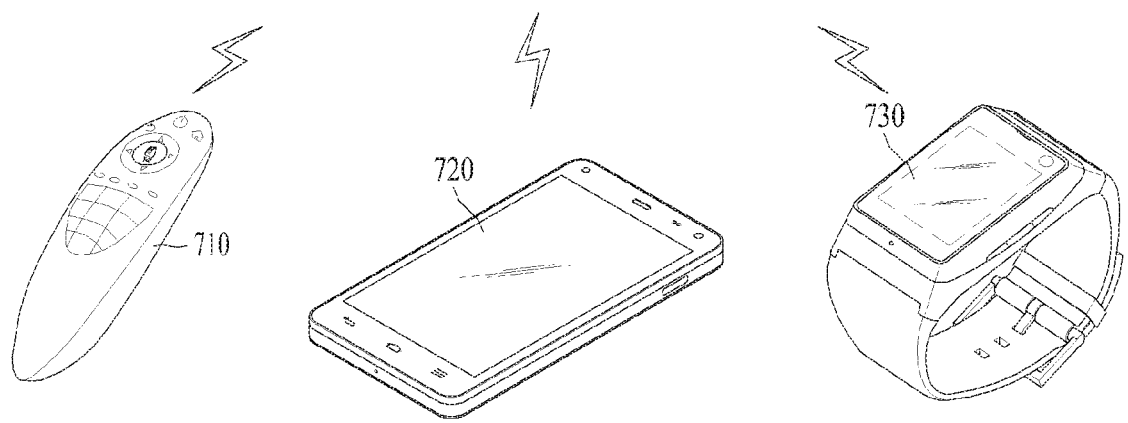

FIG. 15
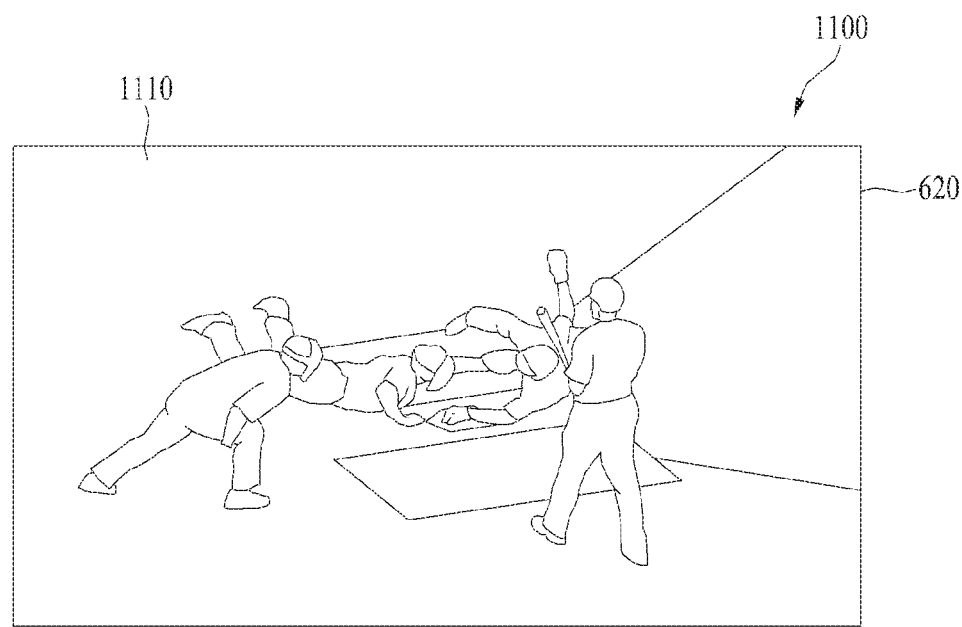
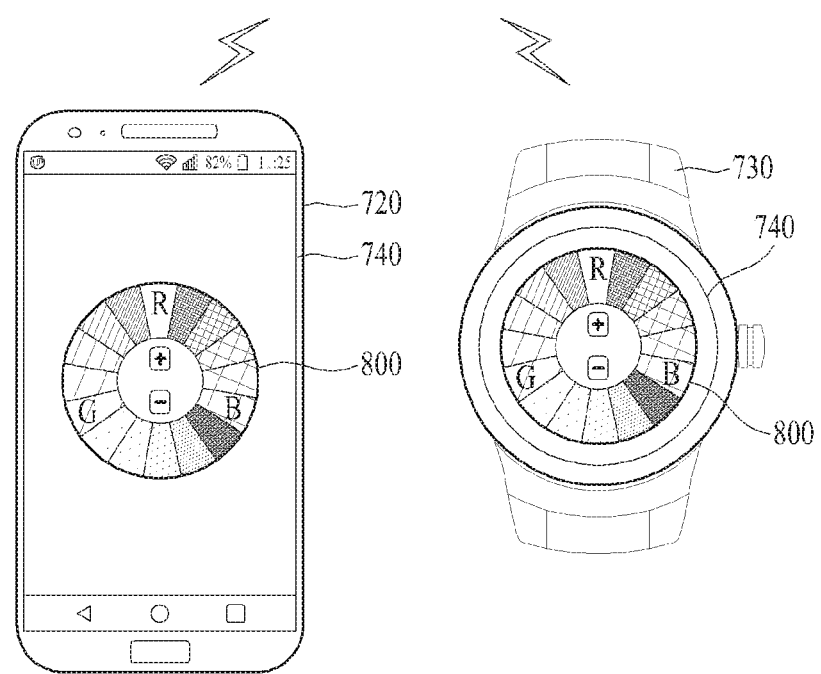

DIGITAL DEVICE, AND SYSTEM AND METHOD FOR CONTROLLING COLOR USING SAME

CROSS-REFERENCE TO RELATED APPLICATIONS

This application is the National Stage filing under 35 U.S.C. 371 of International Application No. PCT/KR2016/009105, filed on Aug. 18, 2016, which claims the benefit of earlier filing date and right of priority to Korean Application No. 10-2016-0002160, filed on Jan. 7, 2016, the contents of which are all hereby incorporated by reference herein in their entirety.

TECHNICAL FIELD

The present invention relates to a digital device, and more particularly, to a digital device, color control system using the same, and method therefor, suitable for providing uniform colors to a whole screen.

BACKGROUND ART

Mobile devices such as a smartphone, a tablet PC and the like have been developed remarkably after the development of standing devices such as a personal computer (PC), a television (TV) and the like.

The standing device and the mobile device have been developed individually in their own fields, respectively. Yet, a boundary between the two regions becomes blurred recently according to the boom of digital convergence.

As user's expectation rises according to the development or environmental change of such a digital device, there are many requests for supporting various services or applications of high specifications.

Recently, a digital device is evolved into a video wall display consisting of a multitude of display panels to meet the needs for a large screen.

Yet, in a digital device such as a video wall display, as an image of a different color sense is displayed on each display panel, it causes a problem that the color senses should be harmonized.

So, in order to harmonize the color senses of the display panels, the digital device performs auto-calibration using a sensor or camera scheme.

Here, the sensor scheme indicates a scheme of attaching a sensor to a point of a screen and applying a value obtained from the point to a whole screen collectively. The camera scheme is a scheme of recognizing a display region, calculating an average value of the region, and applying the average value to a whole screen collectively.

However, according to the sensor scheme, if display panels are manufactured by different manufacturers, it is difficult to harmonize the color sense of a whole screen. According to the camera scheme, since it is unable to give a different color sense per region of a screen, it causes a problem that an overall white balance is not uniform.

Moreover, as a color value measured by a sensor, a camera or the like is different from a color value actually meeting a person's eye, it causes an inconvenience that a color value should be adjusted per display panel one by one.

DISCLOSURE OF THE INVENTION

Technical Tasks

One technical task of the present invention is to substantially obviate one or more problems due to limitations and disadvantages of the related art. Another technical task of the present invention is to provide a user environment capable of increasing or decreasing a color gain value selected through a color gain adjusting window.

Further technical task of the present invention is to provide user convenience capable of adjusting a color gain value by comparing a color of a current screen with a color to adjust through a color gain adjusting window.

Another further technical task of the present invention is to provide user convenience capable of adjusting a color gain value of another digital device remotely through a color gain adjusting window of a mobile terminal.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a digital device, including an input unit receiving a first input and a second input, a display unit displaying a color gain adjusting window having a multitude of colors arrayed thereon, and a controller controlling the input unit and the display unit, wherein the controller displays the color gain adjusting window on the display unit in response to the first input, wherein if a prescribed color is selected from the color gain adjusting window, the controller extracts each of unique R, G and B values of the selected color, wherein if the second input is received through the color gain adjusting window, the controller increases or decreases the extracted unique R, G and B values in response to the second input, wherein if at least one of the increased unique R, G and B values is equal to or greater than a first reference value, the controller increases a gain value of the corresponding color, and wherein if at least one of the decreased unique R, G and B values is equal to or smaller than a second reference value, the controller decreases a gain value of the corresponding color.

In another technical aspect of the present invention, provided herein is a color control system, including a remote control device calculating and sensing a gain value of a prescribed color through a color gain adjusting window having a multitude colors arrayed thereon and a digital device adjusting calibration of a display panel according to a color gain value received from the remote control device, wherein the remote control device displays the color gain adjusting window on a display in response to a first input, wherein if a prescribed color is selected from the color gain adjusting window, the remote control device extracts each of unique R, G and B values of the selected color, wherein if a second input is received through the color gain adjusting window, the remote control device increases or decreases the extracted unique R, G and B values in response to the second input, wherein if at least one of the increased unique R, G and B values is equal to or greater than a first reference value, the remote control device increases a gain value of the corresponding color, wherein if at least one of the decreased unique R, G and B values is equal to or smaller than a second reference value, the remote control device decreases a gain value of the corresponding color, and wherein the remote control device sends the increased or decreased gain value of the color.

In further technical aspect of the present invention, provided herein is a color control method, including checking whether a first input is received, if the first input is received, displaying a color gain adjusting window having a multitude of colors arrayed thereon, checking whether a prescribed color is selected from the color gain adjusting window, if the prescribed color is selected from the color gain adjusting window, extracting each of unique R, G and B values of the selected color, checking whether a second input is received from the color gain adjusting window, if the second input is received from the color gain adjusting window, increasing or decreasing the extracted unique R, G and B values in response to the second input, checking whether at least one of the increased unique R, G and B values is equal to or greater than a first reference value or equal to or smaller than a second reference value, if the at least one of the increased unique R, G and B values is equal to or greater than the first reference value, increasing a gain value of the corresponding color, and if the at least one of the decreased unique R, G and B values is equal to or smaller than the second reference value, decreasing the gain value of the corresponding color.

Advantageous Effects

Effects of a digital device, color control system using the same and method thereof according to the present invention are described as follows.

According to at least one of embodiments of the present invention, it is able to provide a user environment capable of increasing or decreasing a color gain value selected through a color gain adjusting window.

According to at least one of embodiments of the present invention, it is able to provide user convenience capable of adjusting a color gain value by comparing a color of a current screen with a color to adjust through a color gain adjusting window.

According to at least one of embodiments of the present invention, it is able to provide user convenience capable of adjusting a color gain value of another digital device remotely through a color gain adjusting window of a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 4 and FIG. 5 are diagrams to describe a color control process of a digital device according to a first embodiment of the present invention.

FIG. 9 is a diagram to describe a color control process of a digital device according to a third embodiment of the present invention.

FIG. 14 is a diagram to describe a color control process of a digital device according to a fourth embodiment of the present invention.

FIG. 15 is a diagram to describe a color control process of a digital device according to a fifth embodiment of the present invention.

BEST MODE FOR INVENTION

Figure 1:
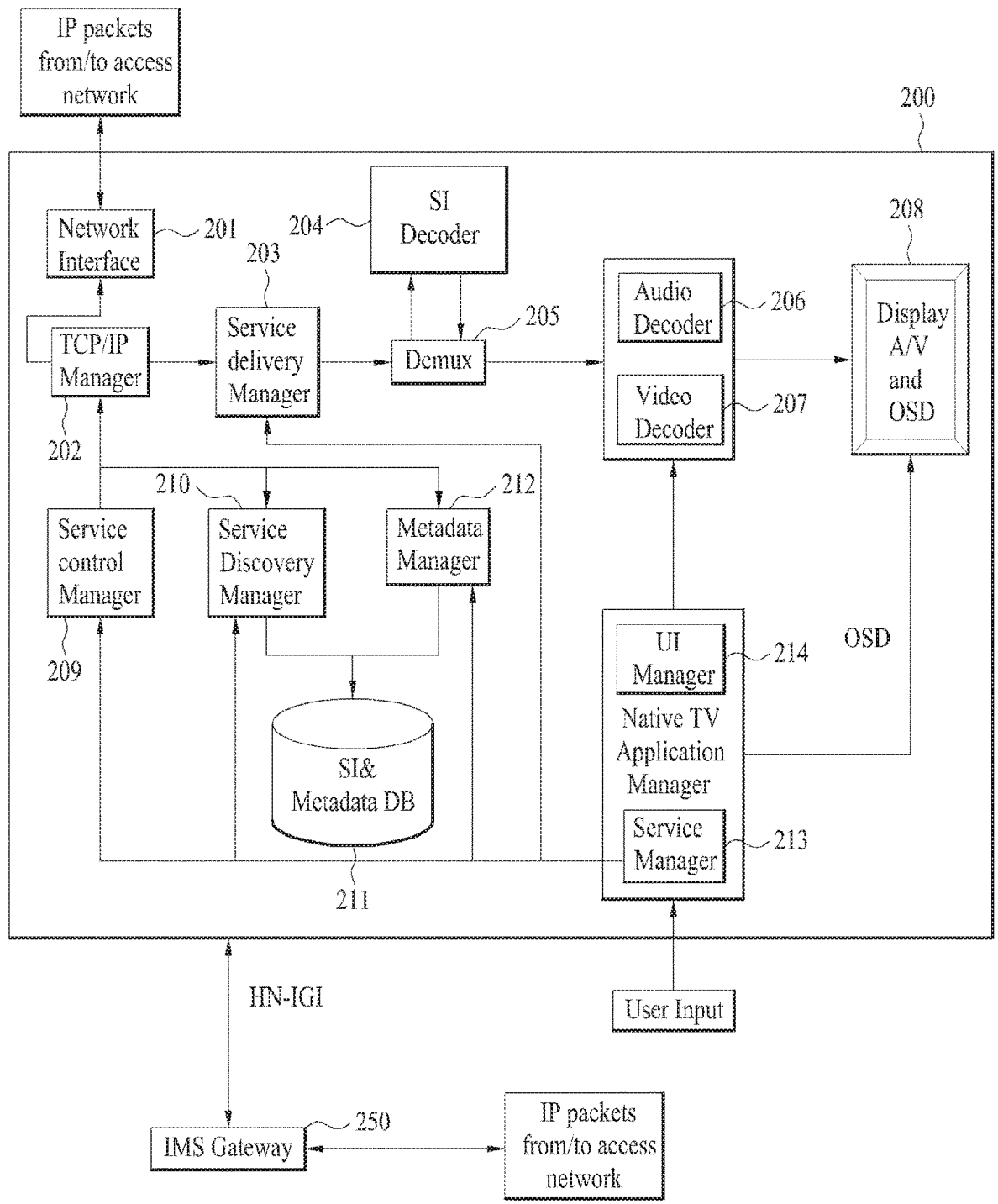
FIG. 1 is a configurational block diagram to describe a digital device according to one embodiment of the present invention.

Description will now be given in detail according to various embodiment(s) for the present invention disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable.

Moreover, although an embodiment of the present invention is described in detail with reference to the accompanying drawings and the contents disclosed in the accompanying drawings, the present invention is not limited or restricted by the embodiments.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Hereinafter, 'digital device' described in the present specification includes any device capable of performing at least one of transmission, reception, processing and output of data, content, service, application and the like for example. The digital device can be paired or connected (hereinafter 'paired') with another digital device, an external server and the like through wire/wireless network and transmit/receive prescribed data through the pairing. In doing so, if necessary, the data may be appropriately converted before the transmission/reception. The digital devices may include standing devices (e.g., Network TV, HBBTV (Hybrid Broadcast Broadband TV), Smart TV, IPTV (Internet Protocol TV), PC (Personal Computer), etc.) and mobile devices (e.g., PDA (Personal Digital Assistant), Smart Phone, Tablet PC, Notebook, etc.). In the present specification, to help the understanding of the present invention and the clarity of the applicant's description, a digital TV and a mobile are shown as embodiments of digital devices in FIG. 1 and FIG. 2, respectively. A digital device described in the present specification may include a panel-only configuration, a configuration such as a set-top box (STB), or a single set configuration of device, system and the like.

Meanwhile, 'wire/wireless network' described in the present specification is a common name of a communication network supportive of various communication specifications and/or protocols for the paring or/and data transceiving between digital devices or between a digital device and an external server. Such wire/wireless networks include all communication networks supported currently or all communication networks that will be supported in the future, by the specifications and are capable of supporting one or more communication protocols for the same. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, if a device is named a digital device in this disclosure, the meaning may indicate a standing device or a mobile device according to a context, or can be used to indicate both unless mentioned specially.

Meanwhile, a digital device is an intelligent device supportive of a broadcast receiving function, a computer function or support, at least one external input and the like, and is able to support e-mail, web browsing, banking, game, application and the like through the aforementioned wire/wireless network. Moreover, the digital device may include an interface (e.g., manual input device, touchscreen, space remote control device, etc.) to support at least one input or control means.

Besides, a digital device may use a standardized OS (operating system). Particularly, a digital device described in the present specification uses webOS for one embodiment. Hence, a digital device can process adding, deleting, amending, updating and the like of various services or applications on Universal OS kernel or Linux kernel, through which a further user-friendly environment can be configured and provided.

Meanwhile, the aforementioned digital device can receive and process an external input. Herein, the external input includes an external input device, i.e., any input means or digital device capable of transmitting/receiving and processing data by being connected to the aforementioned digital device through wire/wireless network. For instance, as the external inputs, a game device (e.g., HDMI (High-Definition Multimedia Interface), Playstation, X-Box, etc.), a printing device (e.g., smart phone, tablet PC, pocket photo, etc.), and a digital device (e.g., smart TV, Blu-ray device, etc.) are included.

Besides, 'server' described in the present specification means a digital device or system that supplies data to the aforementioned digital device (i.e., client) or receives data from it, and may be called a processor. For example, the server may include a portal server providing web page, web content or web service, an advertising server providing advertising data, a content server providing contents, an SNS server providing SNS (Social Network Service), a service server provided by a manufacturer, an MVPD (Multichannel Video Programming Distributor) providing VoD (Video on Demand) or streaming service, a service server providing a pay service and the like.

Moreover, in case that the following description is made using an application only for clarity in the present specification, it may mean a service as well as an application on the basis of a corresponding content and the like. Moreover, an application may mean a web application according to a webOS platform.

In the following description, the present invention is explained in detail with reference to the accompanying drawings.

FIG. 1 is a block diagram showing a digital device according to one embodiment of the present invention.

The digital device 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) through an accessed network. For instance, the network interface 201 may receive services, applications, contents and the like from the service provider 20 shown in FIG. 1 through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (system information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital device 200. So to speak, the application manager can administrate the overall states of the digital device 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212.

The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system.

The SI & metadata database 211 may be implemented with non-volatile RAM (NVRAM), flash memory and the like.

Meanwhile, an IMS gateway 250 is a gateway in which functions required for an access to an IMS based IPTV service are collected.

Figure 2:
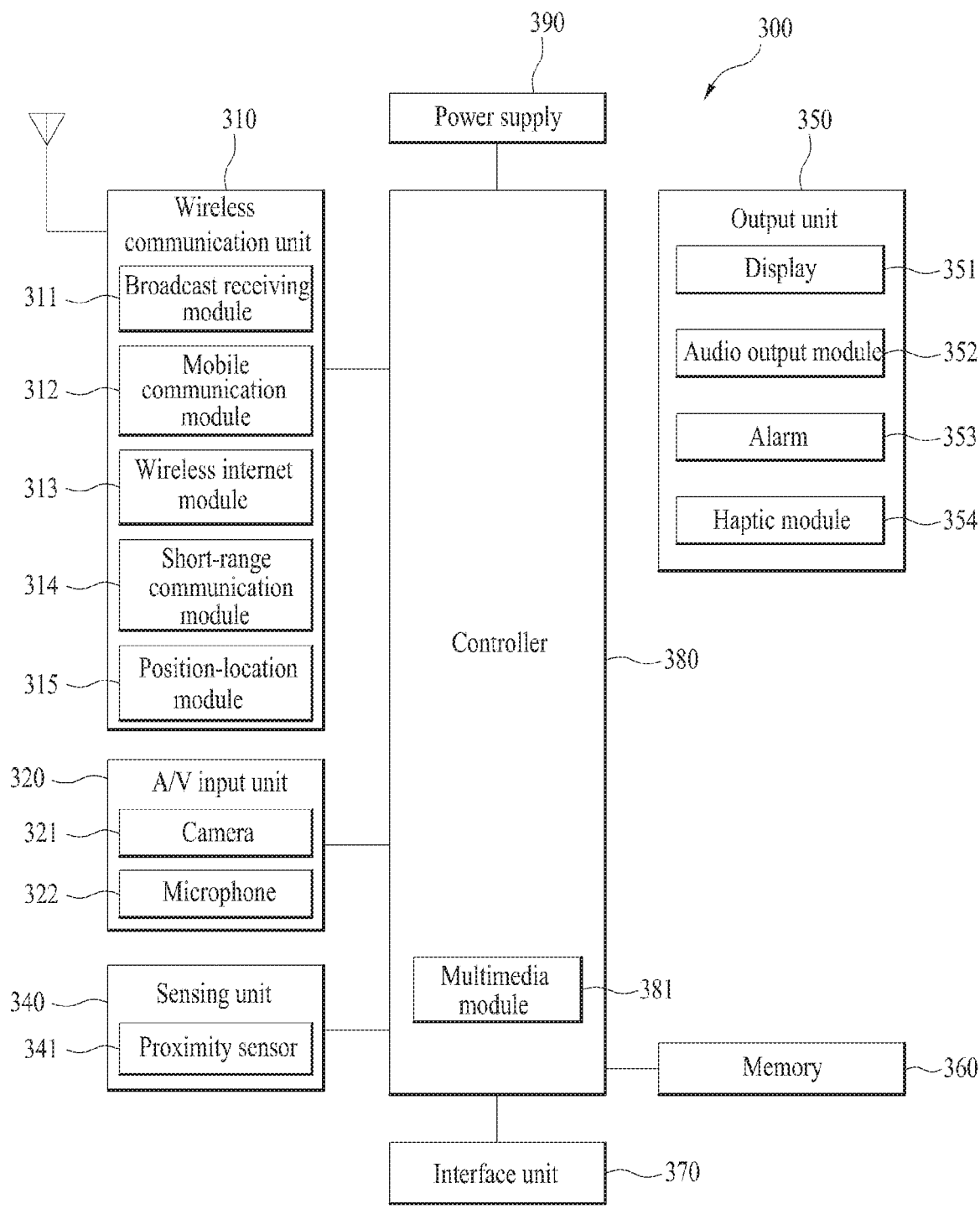
FIG. 2 is a configurational block diagram to describe a digital device according to another embodiment of the present invention.

FIG. 2 is a block diagram to describe a digital device according to another embodiment of the present invention.

The former description with reference to FIG. 1 is made by taking a standing device as one embodiment of a digital device. And, FIG. 2 uses a mobile device as another embodiment of a digital device.

Referring to FIG. 2, the mobile device 300 includes a wireless communication unit 310, an A/V (audio/video) input unit 320, a user input unit 330, a sensing unit 340, an output unit 350, a memory 360, an interface unit 370, a controller 380, a power supply unit 390, etc.

The respective components are described in detail as follows.

The wireless communication unit 310 typically includes one or more modules which permit wireless communication between the mobile device 300 and a wireless communication system or network within which the mobile device 300 is located. For instance, the wireless communication unit 310 can include a broadcast receiving module 311, a mobile communication module 312, a wireless Internet module 313, a short-range communication module 314, a location information module 315, etc.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms, e.g., an electronic program guide (EPG), an electronic service guide (ESG), and the like.

The broadcast receiving module 311 may be configured to receive digital broadcast signals using broadcasting systems such as ATSC, DVB-T (Digital Video Broadcasting-Terrestrial), DVB-S (Satellite), MediaFLO (Media Forward Link Only), DVB-H (Handheld), ISDB-T (Integrated Services Digital Broadcast-Terrestrial), and the like. Optionally, the broadcast receiving module 311 can be configured to be suitable for other broadcasting systems as well as the above-noted digital broadcasting systems.

The broadcast signal and/or broadcast associated information received by the broadcast receiving module 311 may be saved to the memory 360.

The mobile communication module 312 transmits/receives wireless signals to/from at least one of a base station, an external terminal, and a server via a mobile network. Such wireless signals may carry audio signals, video signals, and data of various types according to transceived text/multimedia messages.

The wireless Internet module 313 includes a module for wireless Internet access and may be internally or externally coupled to the mobile device 300. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 314 is a module for short-range communications. Suitable technologies for implementing this module include Bluetooth, radio frequency identification (RFID), infrared data association (IrDA), ultra-wideband (UWB), ZigBee, RS-232, RS-485 and the like.

The location information module 315 is a module for obtaining location information of the mobile terminal 100. And, this module may be implemented with a global positioning system (GPS) module for example.

The audio/video (A/V) input unit 320 is configured to provide audio or video signal input. The A/V input unit 320 may include a camera 321, a microphone 322 and the like. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or transmitted externally via the wireless communication unit 310. Optionally, at least two cameras 321 can be provided according to the environment of usage.

The microphone 322 receives an external audio signal in call mode, recording mode, voice recognition mode, or the like. This audio signal is processed and converted into electrical audio data. The processed audio data is transformed into a format transmittable to a mobile communication base station via the mobile communication module 312 in call mode. The microphone 322 typically includes assorted noise cancelling algorithms to cancel noise generated in the course of receiving the external audio signal.

The user input unit 330 generates input data for a user to control an operation of the terminal. The user input unit 330 may include a keypad, a dome switch, a touchpad (e.g., static pressure/capacitance), a jog wheel, a jog switch, and/or the like.

The sensing unit 340 generates sensing signals for controlling operations of the mobile device 300 using status measurements of various aspects of the mobile terminal. For instance, the sensing unit 340 may detect an open/closed status of the mobile device 300, a location of the mobile device 300, an orientation of the mobile device 300, a presence or absence of user contact with the mobile device 300, an acceleration/deceleration of the mobile device 300, and the like. For example, if the mobile device 300 is moved or inclined, it is able to sense a location or inclination of the mobile device. Moreover, the sensing unit 340 may sense a presence or absence of power provided by the power supply unit 390, a presence or absence of a coupling or other connection between the interface unit 370 and an external device, and the like. Meanwhile, the sensing unit 340 may include a proximity sensor 341 such as NFC (near field communication) and the like.

The output unit 350 generates output relevant to the senses of vision, hearing and touch, and may include the display 351, an audio output module 352, an alarm unit 353, a haptic module 354, and the like.

The display 351 is typically implemented to visually display (output) information processed by the mobile device 300. For instance, if the mobile terminal is operating in phone call mode, the display will generally provide a user interface (UI) or graphical user interface (GUI) related to a phone call. For another instance, if the mobile device 300 is in video call mode or photographing mode, the display 351 may display photographed or/and received images or UI/GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile device 300 may include one or more of such displays.

Some of the displays can be implemented in a transparent or optical transmittive type, which can be called a transparent display. A representative example of the transparent display is the TOLED (transparent OLED). A rear configuration of the display 351 can be implemented as the optical transmittive type as well. In this configuration, a user may be able to see an object located in rear of a terminal body through a region occupied by the display 351 of the terminal body.

Two or more displays 351 can be provided to the mobile device 300 in accordance with an implementation type of the mobile device 300. For instance, a plurality of displays can be disposed on the mobile device 300 in a manner of being spaced apart from a single face or being integrally formed on a single face. Alternatively, a plurality of displays may be disposed on different faces of the mobile device 300, respectively.

If the display 351 and a sensor (hereinafter called 'touch sensor') for detecting a touch action configure a mutual layer structure, the display 351 is usable as an input device as well as an output device. In this case, the touch sensor can be configured with a touch film, a touch sheet, a touchpad, or the like.

The touch sensor can be configured to convert a pressure applied to a specific portion of the display 351 or a variation of capacitance generated from a specific portion of the display 351 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 380. Therefore, the controller 380 is able to know whether a prescribed portion of the display 351 is touched.

A proximity sensor 341 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call signal receiving mode, a phone call mode, a recording mode, a voice recognition mode, a broadcast receiving mode and the like to output audio data which is received from the wireless communication unit 310 or stored in the memory 360. During operation, the audio output module 352 may output an audio signal related to a function (e.g., call received sound, message received sound, etc.) executed in the mobile device 300. The audio output module 352 may include a receiver, a speaker, a buzzer and the like.

The alarm unit 353 outputs a signal for announcing the occurrence of an event of the mobile device 300. Typical events occurring in the mobile device may include a call signal received, a message received, a touch input received, and the like. The alarm unit 353 may output a signal for announcing the event occurrence by way of vibration as well as video or audio signal. The video or audio signal can be outputted via the display 351 or the audio output module 352. Hence, the display 351 or the audio output module 352 can be sorted into a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, two or more haptic modules 354 can be provided to the mobile device 300 in accordance with a configuration type of the mobile device 300.

The memory 360 may store a program for an operation of the controller 380, or may temporarily store inputted/outputted data (e.g., phonebook, message, still image, video, etc.). And, the memory 360 may store data of vibrations and sounds of various patterns outputted in response to a touch input to the touchscreen.

The memory 360 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile device 300 is able to operate in association with the web storage for performing a storage function of the memory 360 on the Internet.

The interface unit 370 may play a role as a passage to every external device connected to the mobile device 300 with external devices. The interface unit 370 receives data from the external devices, delivers a supplied power to the respective elements of the mobile device 300, or enables data within the mobile device 300 to be transferred to the external devices. For instance, the interface unit 370 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile device 300 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile device 300 through a port.

When the mobile device 300 is connected to an external cradle, the interface unit 370 becomes a passage for supplying the mobile device 300 with a power from the cradle or a passage for delivering various command signals input from the cradle by a user to the mobile device 300. Each of the various command signals inputted from the cradle or the power can operate as a signal for recognizing that the mobile device 300 is correctly installed in the cradle.

The controller 380 typically controls the overall operations of the mobile device 300. For example, the controller 380 performs the control and processing associated with voice calls, data communications, video calls, and the like. The controller 380 may include a multimedia module 381 that provides multimedia playback. The multimedia module 381 may be configured as a part of the controller 380, or implemented as a separate component. Moreover, the controller 380 is able to perform a pattern recognition processing for recognizing a writing input and a picture drawing input performed on the touchscreen as a text and an image, respectively.

The power supply unit 390 is supplied with an external or internal power and then supplies a power required for an operation of each component, under the control of the controller 380.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 380.

For software implementation, the embodiments described herein may be implemented with separate software modules, such as procedures and functions, each of which performs one or more of the functions and operations described herein. The software codes can be implemented with a software application written in any suitable programming language. Here, the software codes can be stored in the memory 360 and launched by the controller 380.

Figure 3:
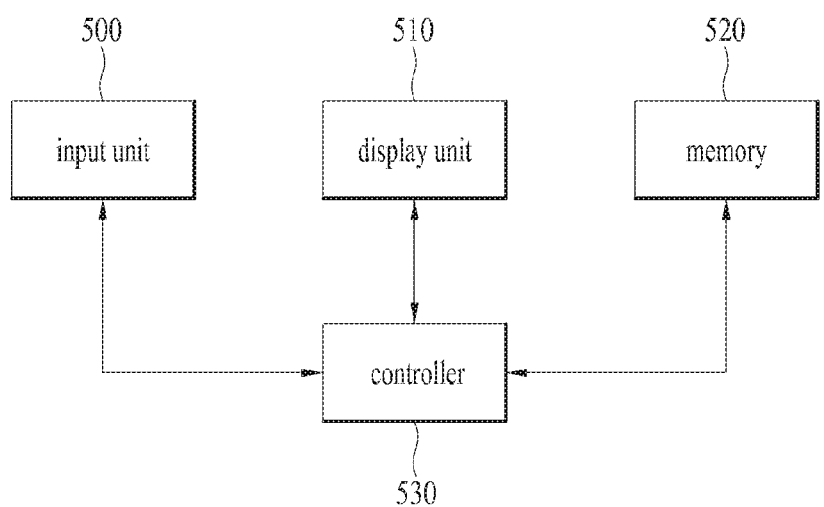
FIG. 3 is a configurational block diagram to describe a color control process of a digital device according to the present invention.

FIG. 3 is a configurational block diagram to describe a color control process of a digital device according to the present invention.

Referring to FIG. 3, a digital device may include an input unit 500, a display unit 510, a memory 520 and a controller 530.

Herein the input unit 500 may receive a first input and a second input.

For example, the first input is an input for requesting to display a color gain adjusting window and may include one of a remote control signal of an external device requesting to display a color gain adjusting window, a touch signal of a specific touch button for requesting to display a color gain adjusting window, and a switching signal of a specific switch button for requesting to display a color gain adjusting window.

The second input is a user input for selecting a color of the color gain adjusting window or adjusting a gain of a color, and may include a user input of touching & dragging a predetermined region of the color gain adjusting window in a specific direction or a user input of selecting a specific touch button.

Thus, the user input may include at least one of a remote control signal received by wire or wireless, a touch signal of directly touching a touchscreen of the display unit 510, a specific gesture signal, and a manipulation signal of manipulating a specific switching button.

The display unit 510 may display the color gain adjusting window on which a multitude of colors are arrayed and adjust a color of a screen according to a color gain value adjusted through the color gain adjusting window.

In some cases, the display unit 510 may adjust a color of a screen according to a color gain value received from an external remote control device without displaying the color gain adjusting window.

The display unit 510 may include a multi-display configuring a single screen in a manner that a multitude of display modules are arranged.

Here, the multi-display may include a standing terminal such as a digital TV, a desktop computer, a digital signage, etc.

In some cases, the display unit 510 may include a single display having a single display panel.

Here, the single display may include a standing terminal such as a digital TV, a desktop computer, a digital signage, etc.

In other cases, the display unit 510 may include a display of a mobile terminal having a single display panel.

Here, the mobile terminal may include a cellular phone, a smartphone, a laptop computer, a digital broadcast terminals a personal digital assistant (PDA), a portable multimedia player (PMP), a navigator, a slate PC, a tablet PC, a ultrabook, a wearable device (e.g., a smart watch, smart glasses, and a head mounted display (HMD)), etc.

And, the controller 530 can control the input unit 500 and the display unit 510.

Here, the controller 530 displays the color gain adjusting window on the display unit 510 in response to the first input. If a prescribed color is selected from the color gain adjusting window, the controller 530 extracts unique R, G and B values of the selected color. If the second input is received through the color gain adjusting window, the controller 530 increases or decreases each of the extracted unique R, G and B values in response to the second input. If at least one of the increased unique R, G and B values is equal to or greater than a first reference value, the controller 530 increases a gain value of the corresponding color. If at least one of the decreased unique R, G and B values is equal to or smaller than a second reference value, the controller 530 can decrease a gain value of the corresponding color.

When the display unit 510 includes a multi-display configuring a single screen in a manner that a multitude of display panels are arrayed, the controller 530 can adjust calibration of each of the display panels through the color gain adjusting window based on the increased or decreased gain value of the color.

Here, the controller 530 can display the color gain adjusting window on a screen of a prescribed one of a multitude of the display panels.

In some cases, the controller 530 may display the color gain adjusting window on a single screen configured with a multitude of the display panels.

For another example, when the display unit 510 includes a multi-display configuring a single screen in a manner that a multitude of display panels are arrayed, the controller 530 may receive a gain value of color increased or decreased through a color gain adjusting window displayed on an external remote control device from the remote control device and then adjust calibration of each of the display panels based on the received gain value of the color.

Here, the remote control device displays the color gain adjusting window on a display in response to a third input. If a prescribed color is selected from the color gain adjusting window, the remote control device extracts unique R, G and B values of the selected color. If a fourth input is received through the color gain adjusting window, the remote control device increases or decreases each of the extracted unique R, G and B values in response to the fourth input. If at least one of the increased unique R, G and B values is equal to or greater than a third reference value, the remote control device increases a gain value of the corresponding color. If at least one of the decreased unique R, G and B values is equal to or smaller than a fourth reference value, the remote control device can decrease a gain value of the corresponding color and send the increased or decreased gain value of the color to the display unit 510.

For example, the third input may include one of a remote control signal of an external device for requesting to display the color gain adjusting window, a touch signal of a specific touch button, and a switching signal of a specific switch button.

The fourth input may include a user input of touching & dragging a predetermined region of the color gain adjusting window in a specific direction or a user input of selecting a specific touch button.

Here, when the fourth input is a touch & drag, if the fourth input of rotating in a first direction along a predetermined region of the color gain adjusting window is received, the remote control device can increase a gain value of the corresponding color by increasing at least one of the extracted unique R, G and B values. If the fourth input of rotating in a second direction along a predetermined region of the color gain adjusting window is received, the remote control device can decrease a gain value of the corresponding color by decreasing at least one of the extracted unique R, G and B values.

In some cases, when the fourth input is a selection of a specific touch button, if the fourth input of selecting an increase button of the color gain adjusting window is received, the remote control device can increase a gain value of the corresponding color by increasing at least one of the extracted unique R, G and B values. If the fourth input of selecting a decrease button of the color gain adjusting window is received, the remote control device can decrease a gain value of the corresponding color by decreasing at least one of the extracted unique R, G and B values.

For another example, when the display unit 510 includes a single display having a single display panel, the controller 530 may adjust calibration of each pixel of the display panel through a color gain adjusting window based on an increased or decreased gain value of a color.

For another example, when the display unit 510 includes a single display having a single display panel, the controller 530 may receive a gain value of a color increased or decreased through a color gain adjusting window displayed on an external remote control device from the remote control device and then adjust calibration of each pixel of the display panel based the received gain value of the color.

For further example, when the display unit 510 includes a display of a mobile terminal having a single display panel, the controller 180 may adjust calibration of each pixel of the display panel based on a gain value of a color increased or decreased through a color gain adjusting window.

Meanwhile, when the second input is a touch & drag, if the second input of rotating in a first direction along a predetermined region of the color gain adjusting window is received, the controller 530 can increase a gain value of the corresponding color by increasing at least one of the extracted unique R, G and B values. If the second input of rotating in a second direction along a predetermined region of the color gain adjusting window is received, the controller 530 can decrease a gain value of the corresponding color by decreasing at least one of the extracted unique R, G and B values.

Here, when the second input is a selection of a specific touch button, if the second input of selecting an increase button of the color gain adjusting window is received, the controller 530 can increase a gain value of the corresponding color by increasing at least one of the extracted unique R, G and B values. If the second input of selecting a decrease button of the color gain adjusting window is received, the controller 530 can decrease a gain value of the corresponding color by decreasing at least one of the extracted unique R, G and B values.

Moreover, the color gain adjusting window may include a center portion for displaying a selected color and a periphery portion on which a multitude of color bars are arrayed to enclose the center portion. If an input of moving in a first direction along the periphery portion of the color gain adjusting window is received, the controller 530 can simultaneously increase color concentrations of the center and periphery portions of the color gain adjusting window.

If an input of moving in a second direction along the periphery portion of the color gain adjusting window is received, the controller 530 can simultaneously decrease color concentrations of the center and periphery portions of the color gain adjusting window.

Here, if an input of moving in a first direction along the periphery portion of the color gain adjusting window is received, the controller 530 may increase a color concentration of the center portion of the color gain adjusting window only. If an input of moving in a second direction along the periphery portion of the color gain adjusting window is received, the controller 530 may decrease a color concentration of the center portion of the color gain adjusting window only.

When extracting unique R, G and B values of a selected color, the controller 530 can extract a unique R value, a unique G vale and a unique B value corresponding to the selected color from the memory 520 having the values stored therein.

When increasing or decreasing each of the extracted unique R, G and B values in response to a second input, the controller 530 can increase or decrease the extracted unique R, G and B values at the same rate each time the second input is received.

When increasing a gain value of a color, if at least one of the increased unique R, G and B values is equal to or greater than 1, the controller 530 can increase a gain value of the corresponding color. If at least one of the increased unique R, G and B values is equal to or smaller than 0, the controller 530 can decrease a gain value of the corresponding color.

Figure 5:
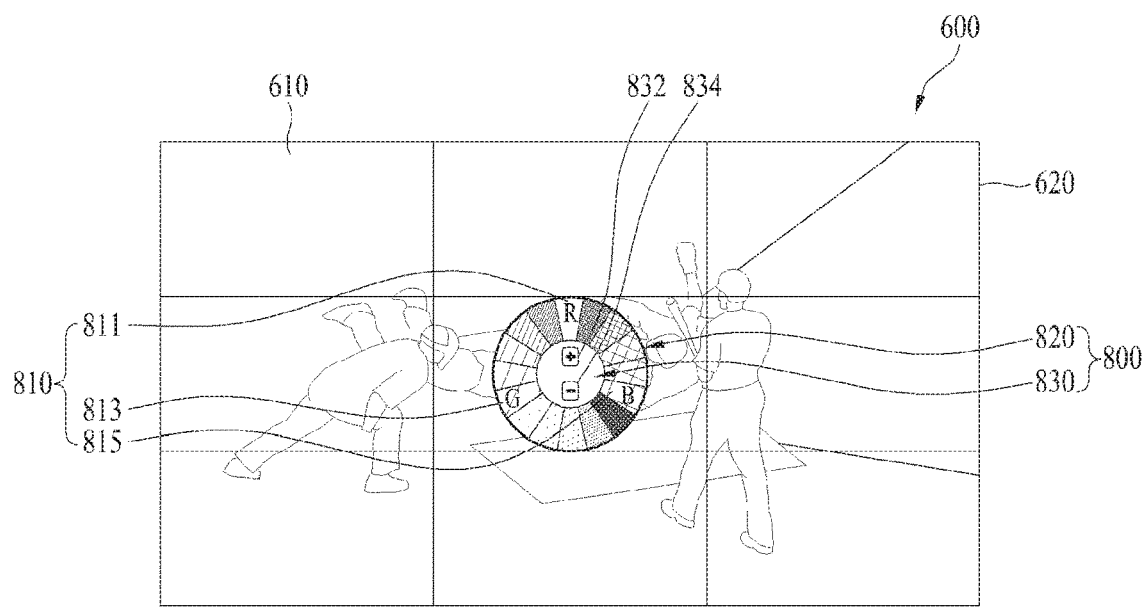

FIG. 4 and FIG. 5 are diagrams to describe a color control process of a digital device according to a first embodiment of the present invention.

Referring to FIG. 4 and FIG. 5, in case that a digital device 600 includes a multi-display configuring a single screen in a manner that a multitude of display panels 610 are arrayed, since each of the display panels 610 displays an image in a different color sense, it is necessary to unify the color sense of the whole display panels 610.

Therefore, the present invention displays a color gain adjusting window 800 on a display unit 600 and is able to perform calibration based on a color gain value configured through the color gain adjusting window 800.

First of all, as shown in FIG. 4, as a multitude of display panels 610 are arrayed, when a prescribed image 620 is displayed on a single screen, if an input for requesting to display a color gain adjusting window is received, the digital device can display a color gain adjusting window for calibration adjustment.

Here, the input is a user input for requesting to display the color gain adjusting window, and may include one of a remote control signal of an external device requesting to display a color gain adjusting window, a touch signal of a specific touch button for requesting to display a color gain adjusting window, and a switching signal of a specific switch button for requesting to display a color gain adjusting window.

For example, the external device requesting to display the color gain adjusting window may include a mobile terminal such as a remote controller 710, a smartphone 720, a smartwatch 730 or the like.

Subsequently, the digital device 600, as shown in FIG. 5, can display a color gain adjusting window 800 on a screen of one of a multitude of the display panels 610.

Here, the color gain adjusting window 800 may be displayed in a manner of overlapping with an image displayed on a screen of the display panel 610.

In some cases, the color gain adjusting window 800 can be displayed only on the display panel 610, on which the image is not displayed, without overlapping the image displayed on the screen of the display panel 610.

The reason for this is to facilitate a user to recognize the color gain adjusting window visually.

Moreover, in case of a multi-display, the color gain adjusting window 800 may be displayed on the display panel 610 located at the center only.

The reason for this is to facilitate a user to use the color gain adjusting window 800.

And, the digital device can adjust calibration of each of the display panels 610 based on a gain value of a color increased or decreased through the color gain adjusting window 800.

For example, the color gain adjusting window 800 may include a center portion 830 displaying a selected color and a periphery portion 820 having a multitude of color bars 810 arrayed thereon to enclose the center portion 830.

If a prescribed color bar 810 is selected from the color bars 810 disposed on the periphery portion 820 of the color gain adjusting window 800, the digital device can display a color corresponding to the selected color bar 810 on the center portion 830.

And, a gain adjusting button of the selected color can be disposed at the center portion 830 of the color gain adjusting window 800.

Here, the gain adjusting button may include an increase button 832 for increasing a gain value and a decrease button 834 for decreasing a gain value.

The color bars 810 disposed on the periphery portion 820 of the color gain adjusting window 800 may include a red bar 811, a green bar 813 and a blue bar 815, which are spaced apart from each other in a predetermined distance.

Here, if the color bars 810 located between the red bar 811 and the green bar 813 get farther from the red bar 811, an increasing rate of a unique R value may decrease but an increasing rate of a unique G value may increase.

If the color bars 810 located between the green bar 813 and the blue bar 815 get farther from the green bar 813, an increasing rate of a unique G value may decrease but an increasing rate of a unique B value may increase.

If the color bars 810 located between the blue bar 815 and the red bar 811 get farther from the blue bar 815, an increasing rate of a unique B value may decrease but an increasing rate of a unique R value may increase.

Therefore, in response to a user request, the digital device displays the color gain adjusting window 800 on the display panel 610. If a user selects a prescribed color bar 810 from the color gain adjusting window 800, the digital device extracts unique R, G and B values for a color of the selected color bar 810.

If the user selects the increase button 832 in the gain adjusting button of the color gain adjusting window 800, the digital device increases each of the extracted unique R, G and B values. If at least one of the increased unique R, G and B values is equal to or greater than a first reference value, the digital device can increase a gain value of the corresponding color.

If the user selects the decrease button 834 in the gain adjusting button of the color gain adjusting window 800, the digital device decreases each of the extracted unique R, G and B values. If at least one of the increased unique R, G and B values is equal to or smaller than a second reference value, the digital device can decrease a gain value of the corresponding color.

For example, in response to a user request, the digital device 600 displays the color gain adjusting window 800 on a single display panel 610.

Here, if receiving a user request signal that is one of a remote control signal of an external device such as the remote controller 710, the smartphone 720, the smartwatch 730 and the like, a touch signal of a specific touch button of the digital device 600, and a switching signal of a specific switch button of the digital device 600, the digital device 600 can display the color gain adjusting window 800.

If the user selects an orange color bar 810 from the color gain adjusting window 800, the digital device 600 extracts each of unique R, G and B values for an orange color of the selected orange color bar 810.

Here, if the unique R, G and B values of the orange color are 1, 0.5 and 0, respectively and if each of R, G and B gain values of the orange color is 100, the digital device 600 extracts 1, 0.5 and 0, which are the unique R, G and B values for the orange color, from the memory.

If a user selects the increase button 832 in the gain adjusting button of the color gain adjusting window 800 once, the digital device 600 places each of 1, 0.5 and 0, which are the extracted unique R, G and B values for the orange color, in the buffer.

Subsequently, if the user selects the increase button 832 in the gain adjusting button of the color gain adjusting window 800 once more, the digital device 600 increases the unique R value of the orange color located in the buffer from 1 to 2, increases the unique G value from 0.5 to 1, maintains the unique B value as 0, and checks whether each of the unique R, G and B values of the orange color is equal to or greater than 1.

Namely, each time the increase button 832 is selected, the digital device can increase each of the unique R, G and B values of the orange color at the same rate.

As the increased unique R value '2' is equal to or greater than a reference value '1', the digital device 600 increases the R gain value of the orange color to 102 from 100.

As the increased unique G value '1' is equal to or greater than the reference value '1', the digital device 600 increases the G gain value of the orange color to 101 from 100.

As the increased unique B value '0' is not equal to or greater than the reference value '1', the digital device 600 maintains the B gain value of the orange color from 100 to 100.

Therefore, if calibration of a display screen is adjusted in a manner of increasing the R gain value of the orange color to 102, increasing the G gain value of the orange color to 101, and maintaining the B gain value of the orange color as 100, the digital device 600 can display an image in which the orange color is stronger than the previous.

For another example, if a user presses the increase button 832 in the gain adjusting button of the color gain adjusting window 800 four times consecutively, the digital device 600 increases the unique R value of the orange color located in the buffer from 1 to 4, increases the unique G value from 0.5 to 2, and maintains the unique B value as 0.

Since the increased unique R value '4' is greater than the reference value '1', the digital device 600 increases the R gain value of the orange color from 100 to 104. Since the increased unique G value '2' is greater than the reference value '1', the digital device 600 increases the G gain value of the orange color from 100 to 102. Since the increased unique B value '0' is not equal to or greater than the reference value '1', the digital device 600 maintains the B gain value of the orange color from 100 to 100.

Therefore, if calibration of a display screen is adjusted in a manner of increasing the R gain value of the orange color to 104, increasing the G gain value of the orange color to 102, and maintaining the B gain value of the orange color as 100, the digital device 600 can display an image in which the orange color is stronger than the previous.

On the contrary, if a user presses the decrease button 834 in the gain adjusting button of the color gain adjusting window 800 four times, the digital device 600 decreases the unique R value of the orange color from 1 to −2, decreases the unique G value from 0.5 to −1, and maintains the unique B value as 0.

Since the decreased unique R value '−2' is smaller than a reference value '0', the digital device 600 decreases the R gain value of the orange color from 100 to 98. Since the decreased unique G value '−1' is smaller than the reference value '0', the digital device 600 decreases the G gain value of the orange color from 100 to 99. Since the increased unique B value '0' is not smaller than the reference value '0', the digital device 600 maintains the B gain value of the orange color from 100 to 100.

Therefore, if calibration of a display screen is adjusted in a manner of decreasing the R gain value of the orange color from 100 to 98, decreasing the G gain value of the orange color from 100 to 99, and maintaining the B gain value of the orange color as 100, the digital device 600 can display an image in which the orange color is weaker than the previous.

The first embodiment of the present invention applies to a multi-display configured with a multitude of display panels and is characterized in that, when a color gain adjusting window is displayed, the color gain adjusting window is displayed on a prescribed display panel among a multitude of the display panels 610 only.

Figure 6:
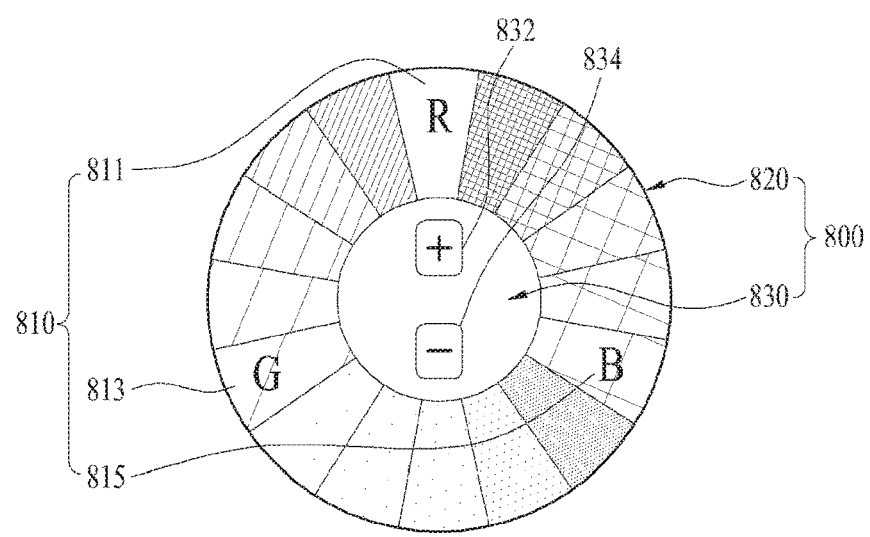
FIG. 6 and FIG. 7 are diagrams to describe color gain adjustment of a color gain adjusting window.
Figure 7:
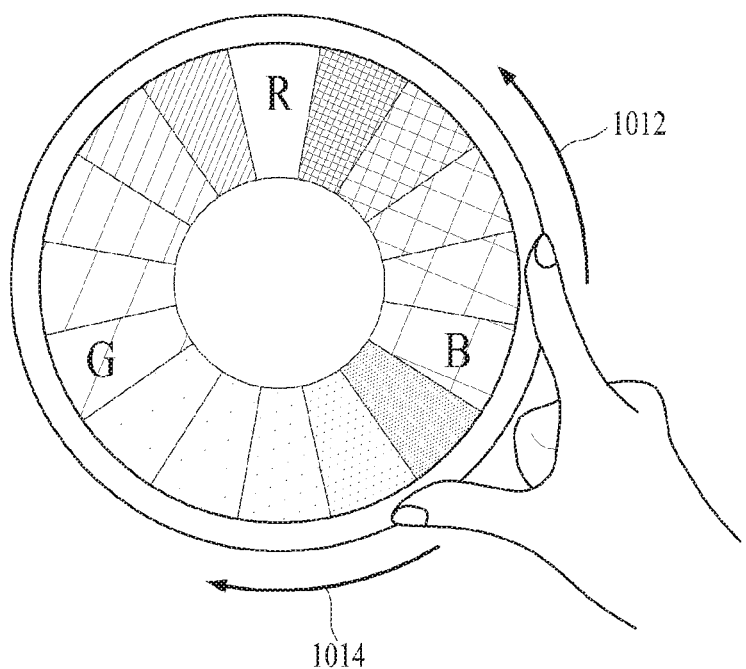

FIG. 6 and FIG. 7 are diagrams to describe color gain adjustment of a color gain adjusting window.

Referring to FIG. 6 and FIG. 7, a color gain adjusting window 800 may include a center portion 830 displaying a selected color and a periphery portion 820 having a multitude of color bars 810 arrayed thereon to enclose the center portion 830.

If a prescribed color bar 810 is selected from the color bars 810 disposed on the periphery portion 820 of the color gain adjusting window 800, the digital device can display a color corresponding to the selected color bar 810 on the center portion 830.

And, as shown in FIG. 6, a gain adjusting button of the selected color can be disposed at the center portion 830 of the color gain adjusting window 800.

Here, the gain adjusting button may include an increase button 832 for increasing a gain value and a decrease button 834 for decreasing a gain value.

Thus, if an input for selecting the increase button 832 of the color gain adjusting window 800 is received, the digital device can increase a gain value of the corresponding color by increasing at least one of the extracted unique R, G and B values. If an input for selecting the decrease button 834 of the color gain adjusting window 800 is received, the digital device can decrease a gain value of the corresponding color by decreasing at least one of the extracted unique R, G and B values.

In some cases, as shown in FIG. 7, the gain adjusting button of the selected color may not be disposed on the center portion 830 of the color gain adjusting window 800.

Here, when an input is a touch & drag, if the input of rotating in a counterclockwise direction 1012 along a predetermined region of the color gain adjusting window 800 is received, the digital device can increase a gain value of the corresponding color by increasing at least one of the extracted unique R, G and B values. If the input of rotating in a clockwise direction 1014 along a predetermined region of the color gain adjusting window 800 is received, the digital device can decrease a gain value of the corresponding color by decreasing at least one of the extracted unique R, G and B values.

The color bars 810 disposed on the periphery portion 820 of the color gain adjusting window 800 may include a red bar 811, a green bar 813 and a blue bar 815, which are spaced apart from each other in a predetermined distance.

Here, if the color bars 810 located between the red bar 811 and the green bar 813 get farther from the red bar 811, an increasing rate of a unique R value may decrease but an increasing rate of a unique G value may increase.

If the color bars 810 located between the green bar 813 and the blue bar 815 get farther from the green bar 813, an increasing rate of a unique G value may decrease but an increasing rate of a unique B value may increase.

If the color bars 810 located between the blue bar 815 and the red bar 811 get farther from the blue bar 815, an increasing rate of a unique B value may decrease but an increasing rate of a unique R value may increase.

Therefore, in response to a user request, the digital device displays the color gain adjusting window 800. If a user selects a prescribed color bar 810 from the color gain adjusting window 800, the digital device extracts unique R, G and B values for a color of the selected color bar 810.

If an input for a gain increase is received, the digital device increases each of the extracted unique R, G and B values at the same rate. If at least one of the increased unique R, G and B values is equal to or greater than a first reference value, the digital device can increase the gain value of the corresponding color.

If an input for a gain decrease is received, the digital device decreases each of the extracted unique R, G and B values at the same rate. If at least one of the decreased unique R, G and B values is equal to or smaller than a second reference value, the digital device can decrease the gain value of the corresponding color.

Figure 8:
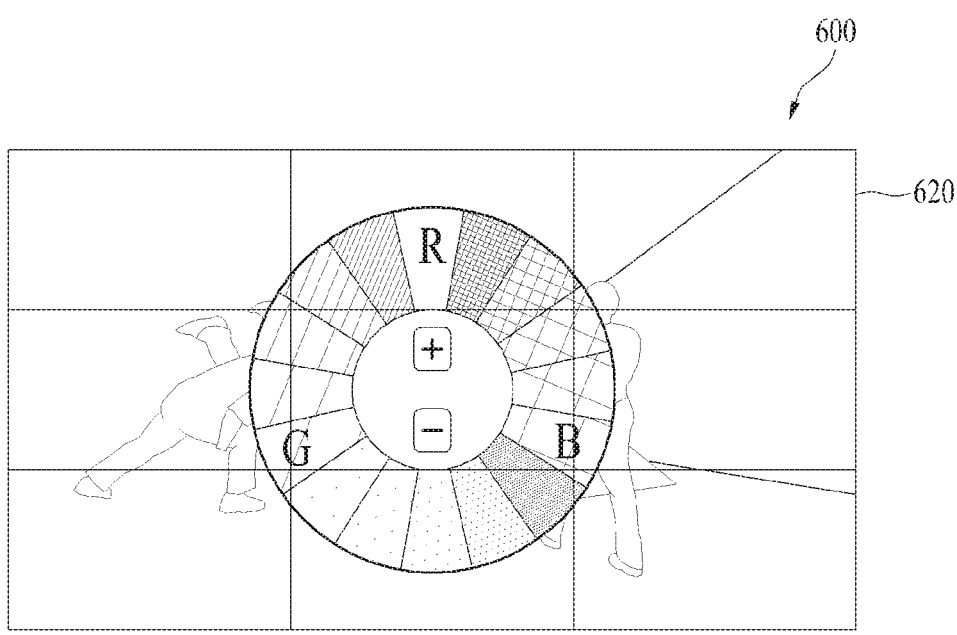
FIG. 8 is a diagram to describe a color control process of a digital device according to a second embodiment of the present invention.

FIG. 8 is a diagram to describe a color control process of a digital device according to a second embodiment of the present invention.

Referring to FIG. 8, in case that a display device 600 is a multi-display configuring a single screen in a manner that a multitude of display panels are arrayed, when a prescribed image 620 is displayed on the single screen configured with a multitude of the arrayed display panels, if an input for requesting to display a color gain adjusting window is received, the digital device can display the color gain adjusting window for calibration adjustment.

Here, the input is a user input for requesting to display the color gain adjusting window, and may include one of a remote control signal of an external device requesting to display a color gain adjusting window, a touch signal of a specific touch button for requesting to display a color gain adjusting window, and a switching signal of a specific switch button for requesting to display a color gain adjusting window.

And, the digital device 600 can display the color gain adjusting window 800 on the single screen configured with a multitude of the display panels.

Here, the color gain adjusting window 800 may be displayed in a manner of overlapping with the image 620 displayed on a large screen configured with a multitude of the display panels 610.

And, the digital device can adjust calibration of each of the display panels 610 based on a gain value of a color increased or decreased through the color gain adjusting window 800.

For example, in response to a user request, the digital device displays the color gain adjusting window 800 on a large screen configured with a multitude of the display panels 610. If a user selects a prescribed color bar 810 from the color gain adjusting window 800, the digital device extracts unique R, G and B values for a color of the selected color bar 810.

If an input for a gain increase is received through the color gain adjusting window 800, the digital device increases each of the extracted unique R, G and B values. If at least one of the increased unique R, G and B values is equal to or greater than a first reference value, the digital device can increase the gain value of the corresponding color.

If an input for a gain decrease is received through the color gain adjusting window 800, the digital device decreases each of the extracted unique R, G and B values. If at least one of the decreased unique R, G and B values is equal to or smaller than a second reference value, the digital device can decrease the gain value of the corresponding color.

The second embodiment of the present invention applies to a multi-display configured with a multitude of display panels and is characterized in that, when a color gain adjusting window is displayed, the color gain adjusting window is displayed on a single screen configured with a multitude of the display panels 610.

FIG. 9 is a diagram to describe a color control process of a digital device according to a third embodiment of the present invention.

Referring to FIG. 9, when the digital device 600 includes a multi-display configuring a single screen in a manner that a multitude of display panels 610 are arrayed, the digital device 600 can display a prescribed image 620 on the single screen configured with a multitude of the arrayed display panels.

If the digital device receives a gain value of a color increased or decreased through a color gain adjusting window displayed on an external remote control device from the remote control device, the digital device can adjust calibration of each of the display panels 610 based on the received gain value of the color.

Here, the remote control device may include a mobile terminal such as a smartphone 720, a smartwatch 730 and the like.

The remote control device displays a color gain adjusting window 800 on a display screen 740 in response to an input. If a prescribed color is selected from the color gain adjusting window 800, the remote control device can extract each of unique R, G and B values of the selected color.

If an input for a gain increase or decrease is received through the color gain adjusting window 800, the remote control device increases or decreases each of the extracted unique R, G and B values in response to the input. If at least one of the increased unique R, G and B values is equal to or greater than a third reference value, the remote control device increases a gain value of the corresponding color. If at least one of the decreased unique R, G and B values is equal to or smaller than a fourth reference value, the remote control device can decrease a gain value of the corresponding color.

Subsequently, the remote control device can send the increased or decreased gain value of the color to the digital device 600.

Here, the third input may include one of a remote control signal of an external device for requesting to display the color gain adjusting window 800, a touch signal of a specific touch button, and a switching signal of a specific switch button.

And, the fourth input may include a user input of touching & dragging a predetermined region of the color gain adjusting window 800 in a specific direction or a user input of selecting a specific touch button.

Here, when the fourth input is a touch & drag, if the fourth input of rotating in a first direction along a predetermined region of the color gain adjusting window 800 is received, the remote control device can increase a gain value of the corresponding color by increasing at least one of the extracted unique R, G and B values. If the fourth input of rotating in a second direction along a predetermined region of the color gain adjusting window is received, the remote control device can decrease a gain value of the corresponding color by decreasing at least one of the extracted unique R, G and B values.

Moreover, when the fourth input is a selection of a specific touch button, if the fourth input of selecting an increase button of the color gain adjusting window 800 is received, the remote control device can increase a gain value of the corresponding color by increasing at least one of the extracted unique R, G and B values. If the fourth input of selecting a decrease button of the color gain adjusting window 800 is received, the remote control device can decrease a gain value of the corresponding color by decreasing at least one of the extracted unique R, G and B values.

The third embodiment of the present invention applies to a multi-display configured with a multitude of display panels and is characterized in that a color gain adjusting window is displayed on a remote control device and that a digital device receives a color gain value adjusted by the remote control device.

And, the third embodiment is characterized in that the digital device can adjust calibration of each display panel 610 based on the received color gain value without displaying a color gain adjusting window.

FIGS. 10 to 13 are diagrams to describe a process for displaying a color gain adjusting window on a remote control device of FIG. 9.

Referring to FIGS. 10 to 13, the remote control device can display the color gain adjusting window 800 on the display screen 740 in response to an input.

Here, the input may include one of a remote control signal of an external device for requesting to display the color gain adjusting window 800, a touch signal of a specific touch button, and a switching signal of a specific switch button.

Figure 10:
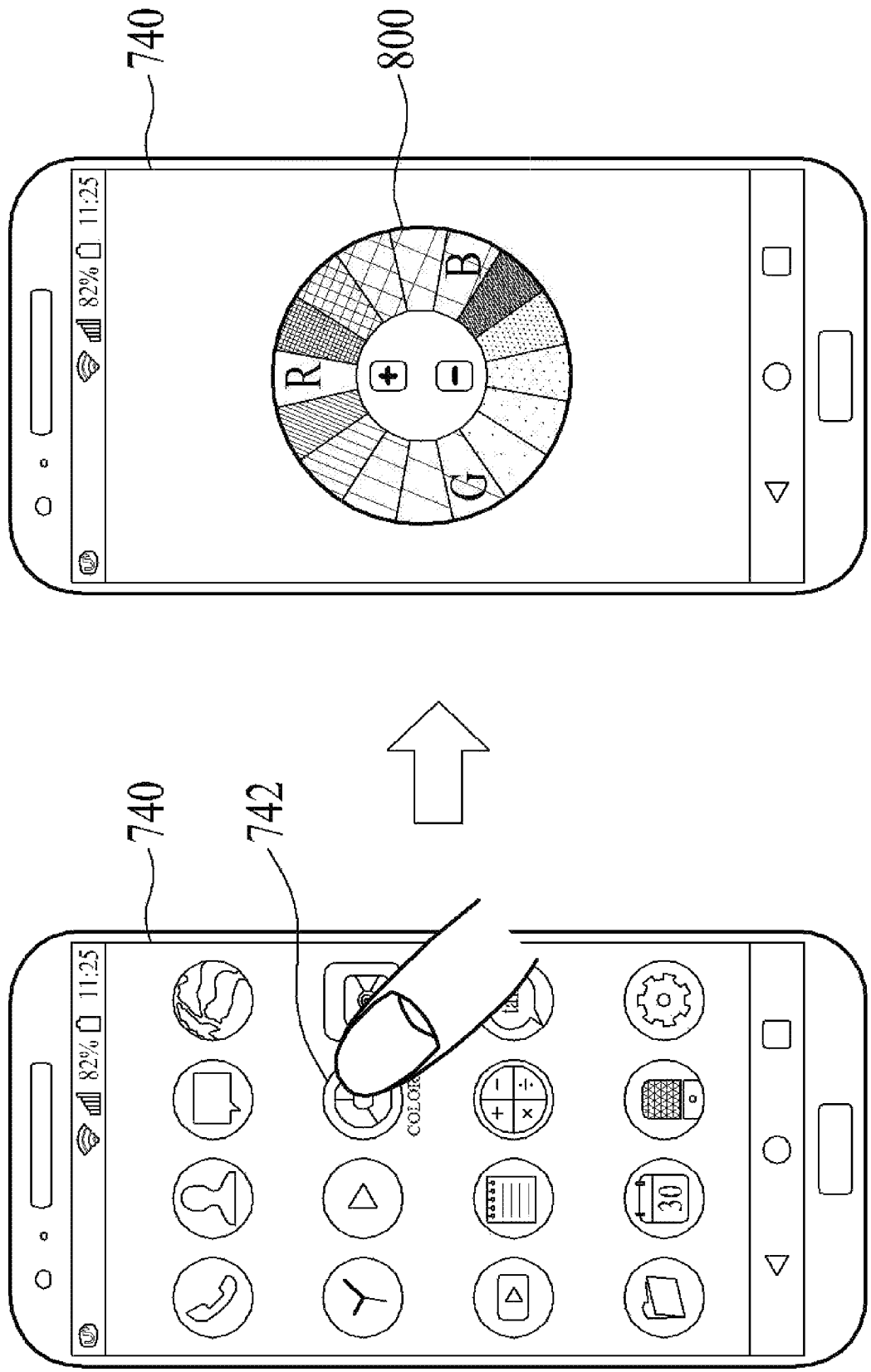
FIGS. 10 to 13 are diagrams to describe a process for displaying a color gain adjusting window on a remote control device of FIG. 9.

The remote control device, as shown in FIG. 10, can display the color gain adjusting window 800 on the display screen 740 in response to the touch signal of the specific touch button.

Here, the remote control device can display a launch icon 742 for launching the color gain adjusting window 800.

If an input of selecting the launch icon 742 is received, the remote control device can display the color gain adjusting window 800 on the display screen 740.

Therefore, if a user adjusts a gain of a desired color and presses a complete button through the color gain adjusting window 800 of the remote control device, the remote control device can send the adjusted color gain value to the digital device.

Figure 11:
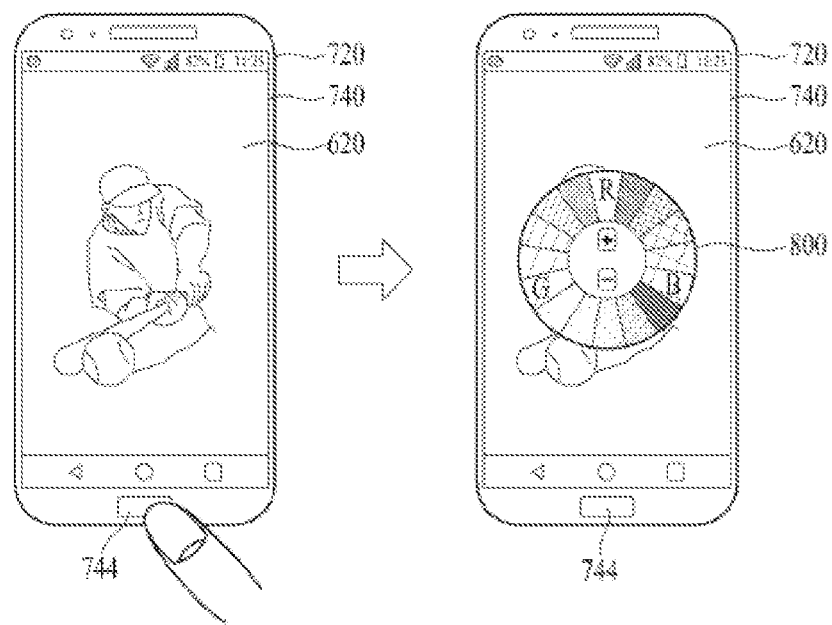
Figure 12:
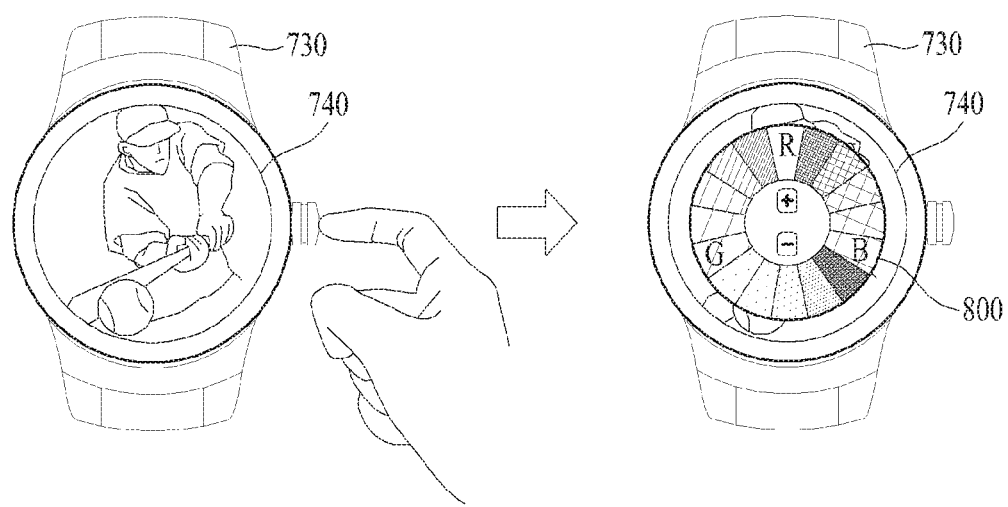

Moreover, as shown in FIG. 11 and FIG. 12, the remote control device can display the color gain adjusting window 800 on the display screen 740 in response to a switching signal of a specific switch button.

Here, as shown in FIG. 11, if the remote control device is a mobile terminal such as a smartphone 720, a hot button 744 for directly executing the color gain adjusting window 800 can be disposed.

Hence, if receiving an input for selecting the hot button 744, the remote control device can directly display the color gain adjusting window 800 on the display screen 740.

Moreover, as shown in FIG. 12, if the remote control device is a mobile terminal such as a smartwatch 730, a hot button 746 for directly executing the color gain adjusting window 800 can be disposed.

Hence, if receiving an input for selecting the hot button 746, the remote control device can directly display the color gain adjusting window 800 on the display screen 740.

Figure 13:
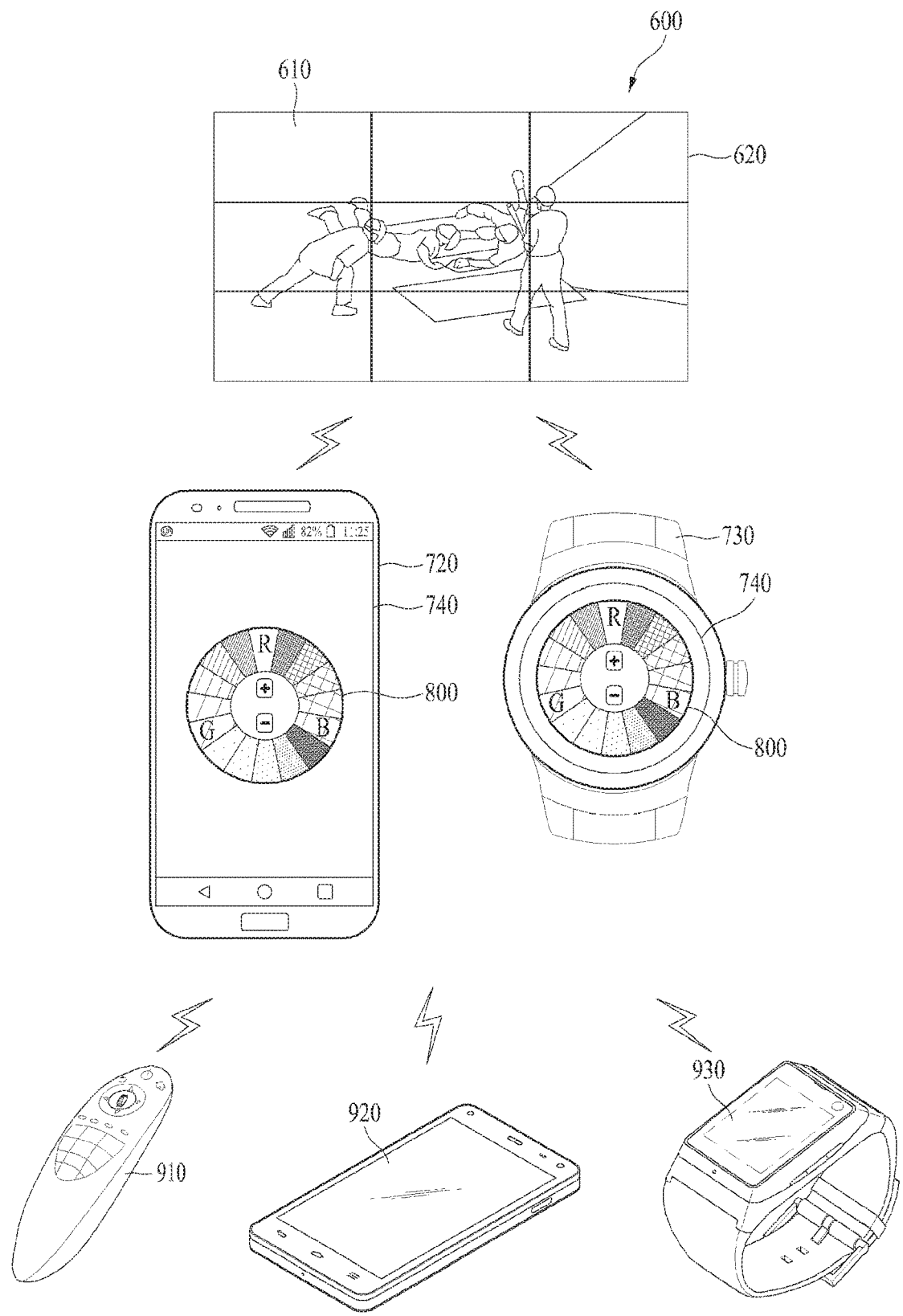

In other cases, as shown in FIG. 13, the remote control device can display the color gain adjusting window 800 on the display screen 740 in response to a remote control signal of an external device.

Here, the external device may be a mobile terminal such as a remote controller 910, a smartphone 920, a smartwatch 930, or the like.

Namely, if receiving a request signal for requesting to display the color gain adjusting window 800 from the external device, the remote control device can directly display the color gain adjusting window 800 on the display screen 740.

And, if a user adjusts a gain of a desired color and presses a complete button through the color gain adjusting window 800 of the remote control device, the remote control device can send the adjusted color gain value to the digital device 600.

Here, the digital device 600 may include at least one of a multi-display configured with a multitude of display panels 610, a single display configured with a single display panel 610 only, and a mobile terminal configured with a single display panel 610 only.

FIG. 14 is a diagram to describe a color control process of a digital device according to a fourth embodiment of the present invention.

Referring to FIG. 14, when a digital device 1100 includes a single display configured with a single display panel only, the digital device can display a prescribed image 620 on a display screen 1110.

If receiving an input for requesting to display a color gain adjusting window, the digital device 1100 can display the color gain adjusting window for calibration adjustment on the display screen 1110.

Here, the input is a user input for requesting to display the color gain adjusting window, and may include one of a remote control signal of an external device requesting to display a color gain adjusting window, a touch signal of a specific touch button for requesting to display a color gain adjusting window, and a switching signal of a specific switch button for requesting to display a color gain adjusting window.

For example, the external device requesting to display the color gain adjusting window may include a mobile terminal such as a remote controller 710, a smartphone 720, a smartwatch 730 or the like.

The color gain adjusting window 800 may be displayed in a manner of overlapping with an image displayed on the display screen 1110.

And, the digital device 1100 can adjust calibration of the display screen 1110 based on a gain value of a color increased or decreased through the color gain adjusting window 800.

For example, in response to a user request, the digital device 1100 displays the color gain adjusting window 800 on the display screen 1110. If a user selects a prescribed color bar 810 from the color gain adjusting window 800, the digital device extracts unique R, G and B values for a color of the selected color bar 810.

If receiving an input for a gain increase through the color gain adjusting window 800, the digital device increases each of the extracted unique R, G and B values. If at least one of the increased unique R, G and B values is equal to or greater than a first reference value, the digital device can increase a gain value of the corresponding color.

If receiving an input for a gain decrease through the color gain adjusting window 800, the digital device decreases each of the extracted unique R, G and B values. If at least one of the increased unique R, G and B values is equal to or smaller than a second reference value, the digital device can decrease a gain value of the corresponding color.

The fourth embodiment of the present invention applies to a single display configured with a single display panel and is characterized in that, when a color gain adjusting window is displayed, the color gain adjusting window is displayed on a display screen.

FIG. 15 is a diagram to describe a color control process of a digital device according to a fifth embodiment of the present invention.

Referring to FIG. 15, when a digital device 1100 includes a single display configured with a single display panel only, the digital device can display a prescribed image 620 on a display screen 1110.

If the digital device 1110 receives a gain value of a color increased or decreased through a color gain adjusting window displayed on an external remote control device from the remote control device, the digital device 1110 can adjust calibration of each of the display screen 1110 based on the received gain value of the color.

Here, the remote control device may include a mobile terminal such as a smartphone 720, a smartwatch 730 or the like.

The remote control device displays a color gain adjusting window 800 on a display screen 740 in response to an input. If a prescribed color is selected from the color gain adjusting window 800, the remote control device can extract each of unique R, G and B values of the selected color.

If an input for a gain increase or decrease is received through the color gain adjusting window 800, the remote control device increases or decreases each of the extracted unique R, G and B values in response to the input. If at least one of the increased unique R, G and B values is equal to or greater than a third reference value, the remote control device increases a gain value of the corresponding color. If at least one of the decreased unique R, G and B values is equal to or smaller than a fourth reference value, the remote control device can decrease a gain value of the corresponding color.

Subsequently, the remote control device can send the increased or decreased gain value of the color to the digital device 600.

Here, the third input may include one of a remote control signal of an external device for requesting to display the color gain adjusting window 800, a touch signal of a specific touch button, and a switching signal of a specific switch button.

And, the fourth input may include a user input of touching & dragging a predetermined region of the color gain adjusting window 800 in a specific direction or a user input of selecting a specific touch button.

Here, when the fourth input is a touch & drag, if the fourth input of rotating in a first direction along a predetermined region of the color gain adjusting window 800 is received, the remote control device can increase a gain value of the corresponding color by increasing at least one of the extracted unique R, G and B values. If the fourth input of rotating in a second direction along a predetermined region of the color gain adjusting window is received, the remote control device can decrease a gain value of the corresponding color by decreasing at least one of the extracted unique R, G and B values.

Moreover, when the fourth input is a selection of a specific touch button, if the fourth input of selecting an increase button of the color gain adjusting window 800 is received, the remote control device can increase a gain value of the corresponding color by increasing at least one of the extracted unique R, G and B values. If the fourth input of selecting a decrease button of the color gain adjusting window 800 is received, the remote control device can decrease a gain value of the corresponding color by decreasing at least one of the extracted unique R, G and B values.

The fifth embodiment of the present invention applies to a single display configured with a single display panel and is characterized in that a color gain adjusting window is displayed on a remote control device and that a digital device receives a color gain value adjusted by the remote control device.

And, the fifth embodiment is characterized in that the digital device can adjust calibration of a display screen 610 based on the received color gain value without displaying a color gain adjusting window.

Figure 16:
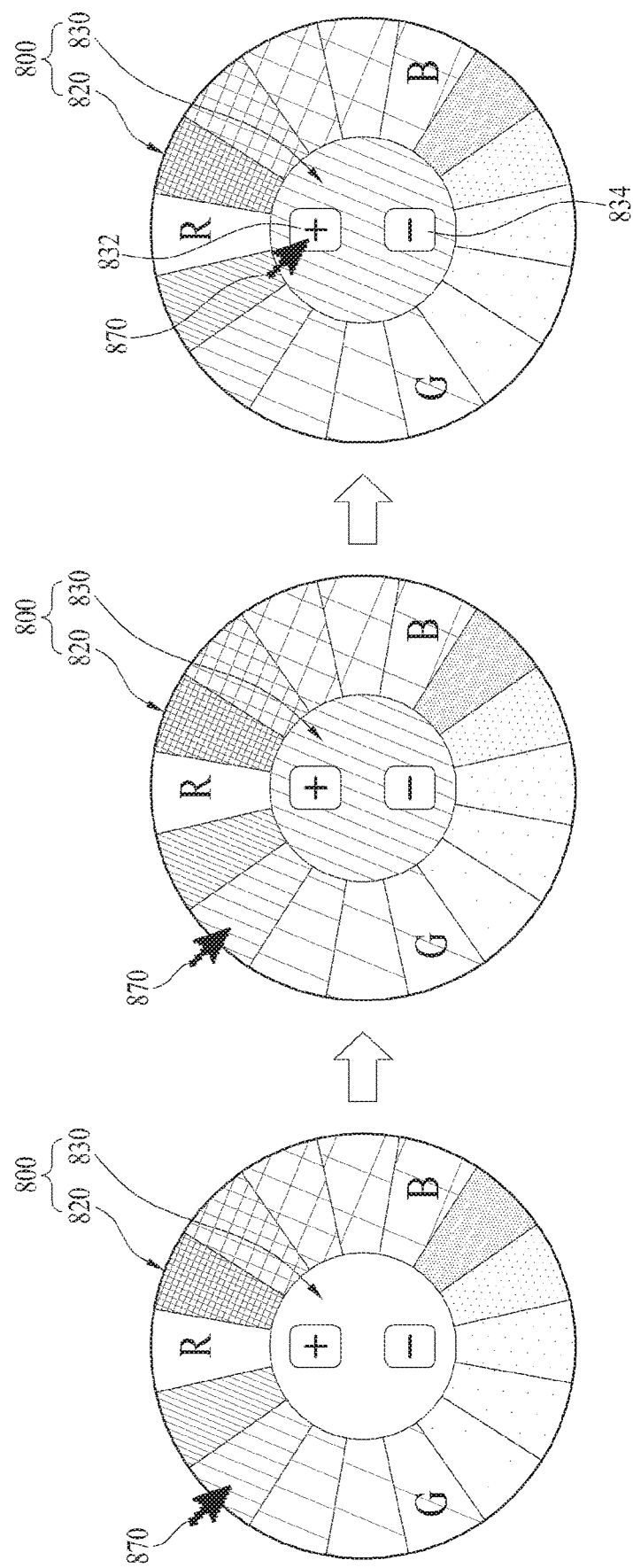
FIG. 16 and FIG. 17 are diagrams to describe a color gain adjusting method using a color gain adjusting window.
Figure 17:
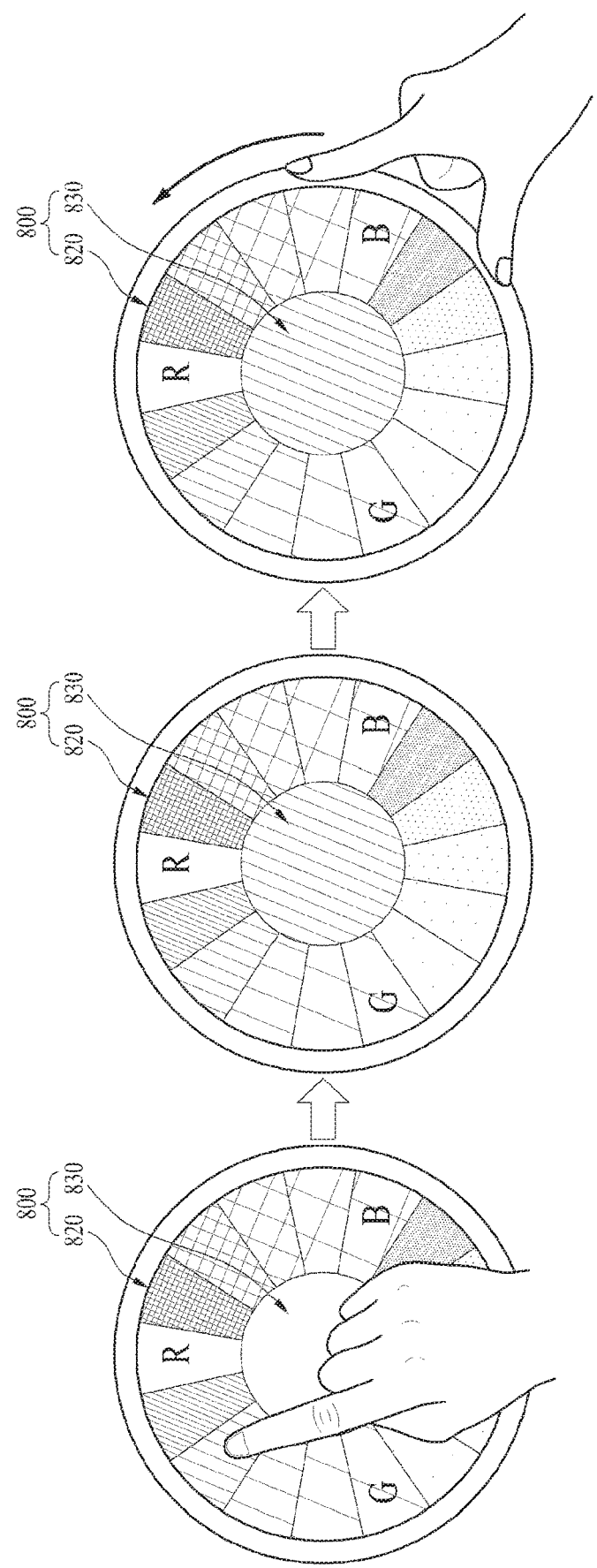

FIG. 16 and FIG. 17 are diagrams to describe a color gain adjusting method using a color gain adjusting window. FIG. 16 shows a scheme of selecting a color gain adjusting window through a remote control device. FIG. 17 shows a scheme of selecting a color gain adjusting window through a user's touch input.

Referring to FIG. 16 and FIG. 17, a color gain adjusting window 800 may include a center portion 830 displaying a selected color and a periphery portion 820 having a multitude of color bars 810 arrayed thereon to enclose the center portion 830.

And, a gain adjusting button of the selected color can be disposed at the center portion 830 of the color gain adjusting window 800.

Here, the gain adjusting button may include an increase button 832 for increasing a gain value and a decrease button 834 for decreasing a gain value.

The color bars 810 disposed on the periphery portion 820 of the color gain adjusting window 800 may include a red bar 811, a green bar 813 and a blue bar 815, which are spaced apart from each other in a predetermined distance.

Here, if the color bars 810 located between the red bar 811 and the green bar 813 get farther from the red bar 811, an increasing rate of a unique R value may decrease but an increasing rate of a unique G value may increase.

If the color bars 810 located between the green bar 813 and the blue bar 815 get farther from the green bar 813, an increasing rate of a unique G value may decrease but an increasing rate of a unique B value may increase.

If the color bars 810 located between the blue bar 815 and the red bar 811 get farther from the blue bar 815, an increasing rate of a unique B value may decrease but an increasing rate of a unique R value may increase.

Meanwhile, as shown in FIG. 16, if receiving a remote control signal from a remote control device, the digital device can display a cursor 870 on the color gain adjusting window 800.

If the cursor 870 selects a prescribed color bar 810 from the color bars 810 disposed on the periphery portion 820 of the color gain adjusting window 800, the digital device can display a color corresponding to the selected color bar 810 on the center portion 830.

If the cursor 870 selects the increase button 832 in the gain adjusting button of the color gain adjusting window 800, the digital device extracts unique R, G and B values for a color of the selected color bar 810 and increases each of the extracted unique R, G and B values. If at least one of the increased unique R, G and B values is equal to or greater than a first reference value, the digital device can increase a gain value of the corresponding color.

If the cursor 870 selects the decrease button 834 in the gain adjusting button of the color gain adjusting window 800, the digital device decreases each of the extracted unique R, G and B values. If at least one of the increased unique R, G and B values is equal to or smaller than a second reference value, the digital device can decrease a gain value of the corresponding color.

For example, if the cursor 870 selects an orange color bar 810 from the color gain adjusting window 800, the digital device extracts each of unique R, G and B values for an orange color of the selected orange color bar 810.

Here, if the unique R, G and B values of the orange color are 1, 0.5 and 0, respectively and if each of R, G and B gain values of the orange color is 100, the digital device 600 extracts 1, 0.5 and 0, which are the unique R, G and B values for the orange color, from the memory.

If the cursor 870 selects the increase button 832 in the gain adjusting button of the color gain adjusting window 800 once, the digital device places each of 1, 0.5 and 0, which are the extracted unique R, G and B values for the orange color, in the buffer.

Subsequently, if the cursor 870 selects the increase button 832 in the gain adjusting button of the color gain adjusting window 800 once more, the digital device increases the unique R value of the orange color located in the buffer from 1 to 2, increases the unique G value from 0.5 to 1, maintains the unique B value as 0, and checks whether each of the unique R, G and B values of the orange color is equal to or greater than 1.

Namely, each time the increase button 832 is selected, the digital device can increase each of the unique R, G and B values of the orange color at the same rate.

As the increased unique R value '2' is equal to or greater than a reference value '1', the digital device increases the R gain value of the orange color to 102 from 100.

As the increased unique G value '1' is equal to or greater than the reference value '1', the digital device increases the G gain value of the orange color to 101 from 100.

As the increased unique B value '0' is not equal to or greater than the reference value '1', the digital device maintains the B gain value of the orange color from 100 to 100.

Therefore, if calibration of a display screen is adjusted in a manner of increasing the R gain value of the orange color to 102, increasing the G gain value of the orange color to 101, and maintaining the B gain value of the orange color as 100, the digital device can display an image in which the orange color is stronger than the previous.

For another example, if the cursor 870 presses the increase button 832 in the gain adjusting button of the color gain adjusting window 800 four times consecutively, the digital device increases the unique R value of the orange color located in the buffer from 1 to 4, increases the unique G value from 0.5 to 2, and maintains the unique B value as 0.

Since the increased unique R value '4' is greater than the reference value '1', the digital device increases the R gain value of the orange color from 100 to 104. Since the increased unique G value '2' is greater than the reference value '1', the digital device increases the G gain value of the orange color from 100 to 102. Since the increased unique B value '0' is not equal to or greater than the reference value '1', the digital device maintains the B gain value of the orange color from 100 to 100.

Therefore, if calibration of a display screen is adjusted in a manner of increasing the R gain value of the orange color to 104, increasing the G gain value of the orange color to 102, and maintaining the B gain value of the orange color as 100, the digital device can display an image in which the orange color is stronger than the previous.

On the contrary, if the cursor 870 presses the decrease button 834 in the gain adjusting button of the color gain adjusting window 800 four times, the digital device decreases the unique R value of the orange color from 1 to −2, decreases the unique G value from 0.5 to −1, and maintains the unique B value as 0.

Here, since the decreased unique R value '−2' is smaller than a reference value '0', the digital device decreases the R gain value of the orange color from 100 to 98. Since the decreased unique G value '−1' is smaller than the reference value '0', the digital device decreases the G gain value of the orange color from 100 to 99. Since the increased unique B value '0' is not smaller than the reference value '0', the digital device maintains the B gain value of the orange color from 100 to 100.

Therefore, if calibration of a display screen is adjusted in a manner of decreasing the R gain value of the orange color from 100 to 98, decreasing the G gain value of the orange color from 100 to 99, and maintaining the B gain value of the orange color as 100, the digital device can display an image in which the orange color is weaker than the previous.

In other cases, as shown in FIG. 17, the gain adjusting button of the selected color may not be disposed at the center portion 830 of the color gain adjusting window 800.

Here, if a user's touch input selects a prescribed color bar 810 from the color bars 810 disposed on the periphery portion 820 of the color gain adjusting window 800, the digital device can display a color corresponding to the selected color bar 810 on the center portion 830.

Subsequently, when an input is a touch & drag, if the input of rotating in a counterclockwise direction 1012 along a predetermined region of the color gain adjusting window 800 is received, the digital device can increase a gain value of the corresponding color by increasing at least one of the extracted unique R, G and B values. If the input of rotating in a clockwise direction 1014 along a predetermined region of the color gain adjusting window 800 is received, the digital device can decrease a gain value of the corresponding color by decreasing at least one of the extracted unique R, G and B values.

Thus, as shown in FIG. 16, the gain adjusting button of the selected color can be disposed within the center portion 830 of the color gain adjusting window 800 of the present invention. And, the gain adjusting button may include the increase button 832 for increasing a gain value and the decrease button 834 for decreasing a gain value.

Here, if an input for selecting the increase button 832 of the color gain adjusting window 800 is received, the digital device can increase a gain value of the corresponding color by increasing at least one of the extracted unique R, G and B values. If an input for selecting the decrease button 834 of the color gain adjusting window 800 is received, the digital device can decrease a gain value of the corresponding color by decreasing at least one of the extracted unique R, G and B values.

Moreover, as shown in FIG. 17, the gain adjusting button of the selected color may not be disposed within the center portion 830 of the color gain adjusting window 800.

Here, when an input is a touch & drag, if the input of rotating in a counterclockwise direction 1012 along a predetermined region of the color gain adjusting window 800 is received, the digital device can increase a gain value of the corresponding color by increasing at least one of the extracted unique R, G and B values. If the input of rotating in a clockwise direction 1014 along a predetermined region of the color gain adjusting window 800 is received, the digital device can decrease a gain value of the corresponding color by decreasing at least one of the extracted unique R, G and B values.

Figure 18:
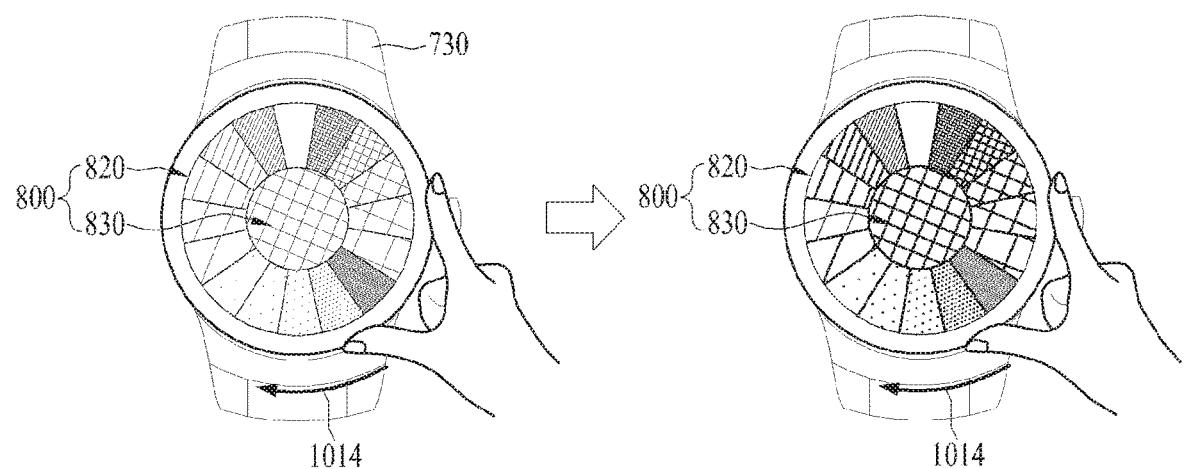
FIG. 18 and FIG. 19 are diagrams showing a color gain adjusting window applied to a smart watch according to one embodiment of the present invention.
Figure 19:
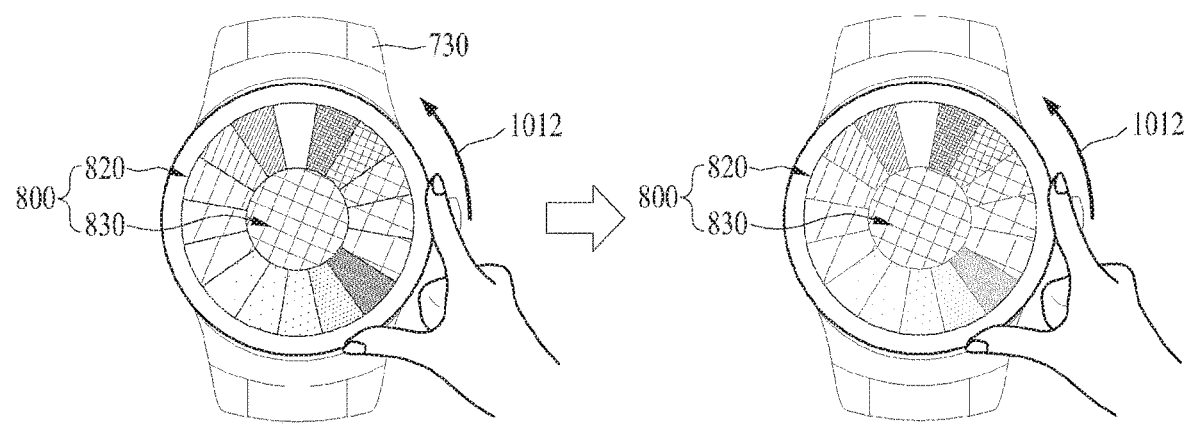

FIG. 18 and FIG. 19 are diagrams showing a color gain adjusting window applied to a smart watch according to one embodiment of the present invention.

Referring to FIG. 18 and FIG. 19, when a digital device is a smartwatch 730, if receiving an input for requesting to display a color gain adjusting window, the smartwatch 730 can display the color gain adjusting window 800 for calibration adjustment on a display screen.

And, if a user's touch input selects a prescribed color bar 810 from the color bars 810 disposed on the periphery portion 820 of the color gain adjusting window 800, the smartwatch 730 can display a color corresponding to the selected color bar 810 on the center portion 830.

Next, when the input is a touch & drag, if the input of rotating in a first direction along a predetermined region of the color gain adjusting window 800 is received, the smartwatch 730 can increase a gain value of the corresponding color by increasing at least one of the extracted unique R, G and B values.

For example, as shown in FIG. 18, if an input of moving in a clockwise direction 1014 along the periphery portion 820 of the color gain adjusting window 800 is received, the smartwatch 730 can simultaneously increase color concentrations of the center portion 830 and the periphery portion 820 of the color gain adjusting window 800.

Moreover, when the input is a touch & drag, if the input of rotating in a second direction along a predetermined region of the color gain adjusting window 800 is received, the smartwatch 730 can decrease a gain value of the corresponding color by decreasing at least one of the extracted unique R, G and B values.

For example, as shown in FIG. 19, if an input of moving in a counterclockwise direction 1012 along the periphery portion 820 of the color gain adjusting window 800 is received, the smartwatch 730 can simultaneously decrease color concentrations of the center portion 830 and the periphery portion 820 of the color gain adjusting window 800.

Figure 20:
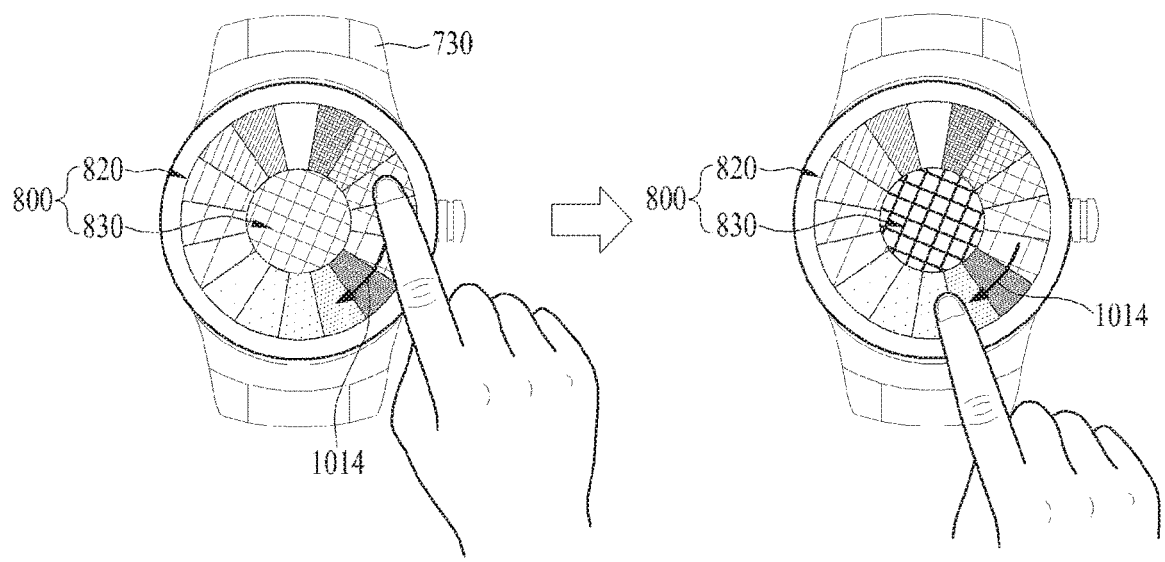
FIG. 20 and FIG. 21 are diagrams showing a color gain adjusting window applied to a smart watch according to another embodiment of the present invention.
Figure 21:
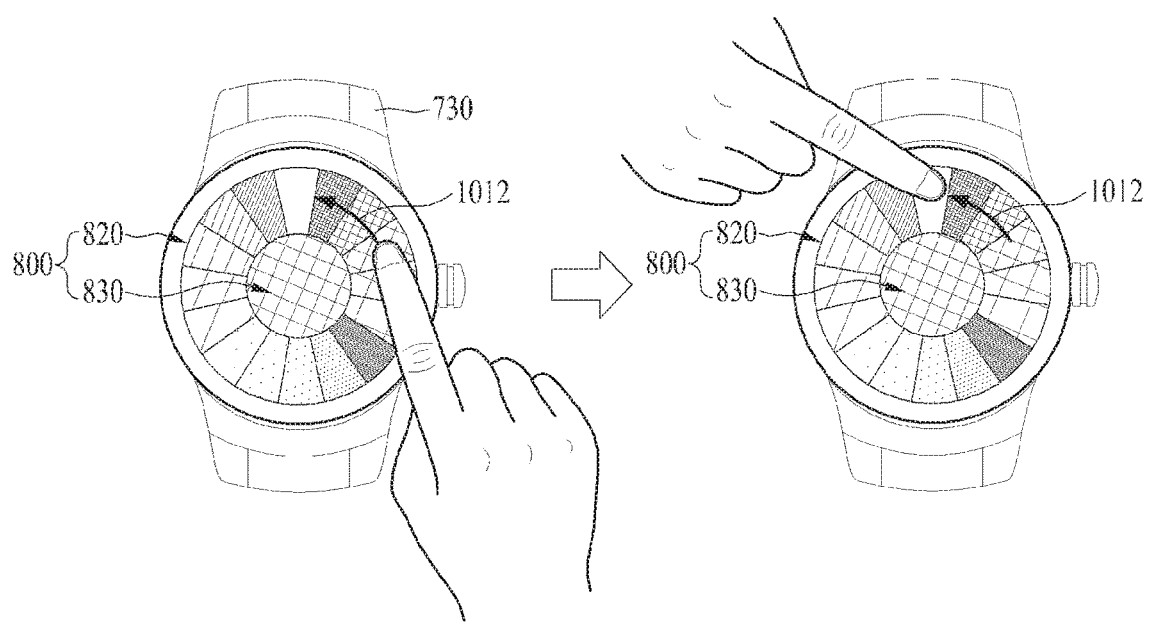

FIG. 20 and FIG. 21 are diagrams showing a color gain adjusting window applied to a smart watch according to another embodiment of the present invention.

Referring to FIG. 20 and FIG. 21, when a digital device is a smartwatch 730, if receiving an input for requesting to display a color gain adjusting window, the smartwatch 730 can display the color gain adjusting window 800 for calibration adjustment on a display screen.

And, if a user's touch input selects a prescribed color bar 810 from the color bars 810 disposed on the periphery portion 820 of the color gain adjusting window 800, the smartwatch 730 can display a color corresponding to the selected color bar 810 on the center portion 830.

Next, when the input is a touch & drag, if the input of rotating in a first direction along a predetermined region of the color gain adjusting window 800 is received, the smartwatch 730 can increase a gain value of the corresponding color by increasing at least one of the extracted unique R, G and B values.

For example, as shown in FIG. 20, if an input of moving in a clockwise direction 1014 along the periphery portion 820 of the color gain adjusting window 800 is received, the smartwatch 730 can simultaneously increase a color concentration of the center portion 830 of the color gain adjusting window 800 only.

Moreover, when the input is a touch & drag, if the input of rotating in a second direction along a predetermined region of the color gain adjusting window 800 is received, the smartwatch 730 can decrease a gain value of the corresponding color by decreasing at least one of the extracted unique R, G and B values.

For example, as shown in FIG. 21, if an input of moving in a counterclockwise direction 1012 along the periphery portion 820 of the color gain adjusting window 800 is received, the smartwatch 730 can decrease a color concentration of the center portion 830 of the color gain adjusting window 800 only.

Figure 22:
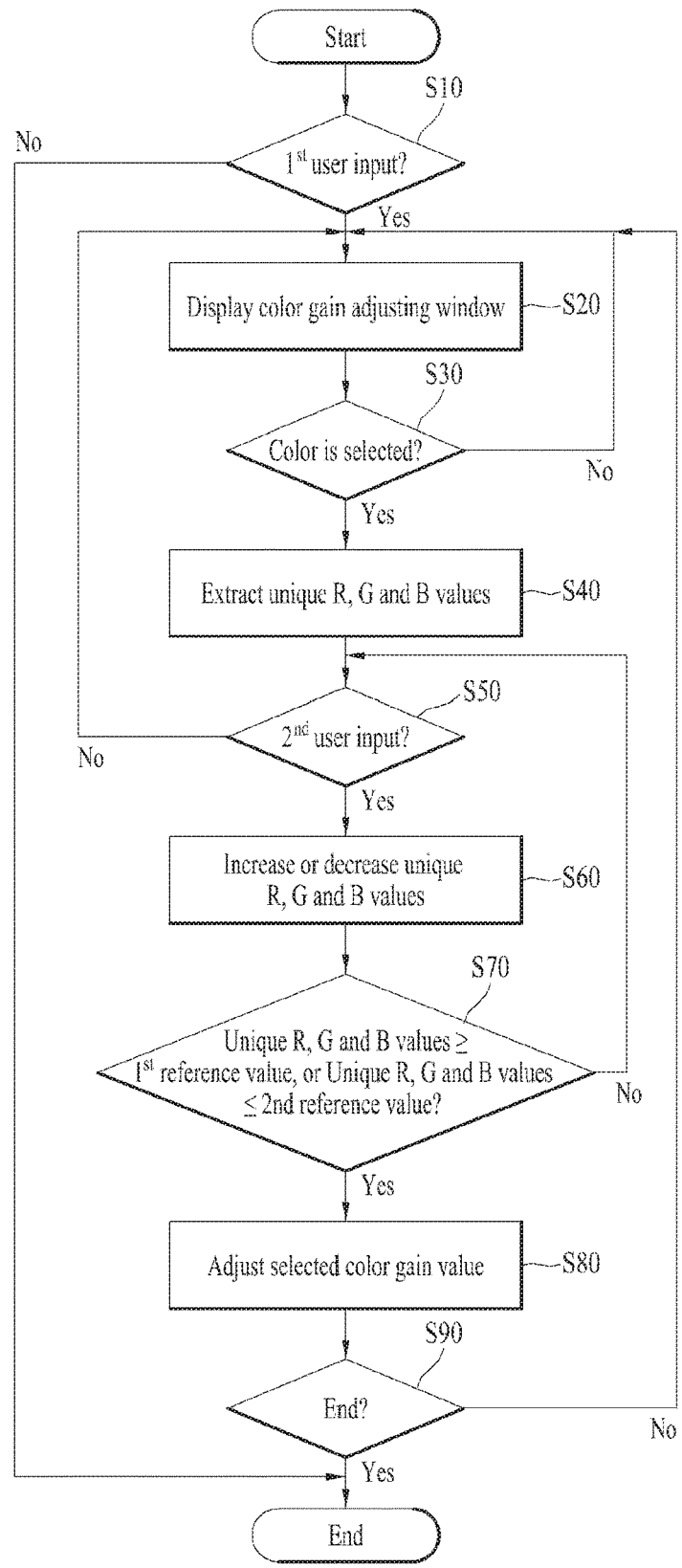
FIG. 22 is a flowchart to describe a color control method of a digital device according to the present invention.

FIG. 22 is a flowchart to describe a color control method of a digital device according to the present invention.

Referring to FIG. 22, a digital device checks whether a first input is received [S10].

For example, the first input is an input for requesting to display a color gain adjusting window and may include one of a remote control signal of an external device requesting to display a color gain adjusting window, a touch signal of a specific touch button for requesting to display a color gain adjusting window, and a switching signal of a specific switch button for requesting to display a color gain adjusting window.

If the first input is received, the digital device displays a color gain adjusting window on which a multitude of colors are arrayed [S20].

Here, the color gain adjusting window may include a center portion displaying a selected color and a periphery portion having a multitude of color bars 810 arrayed thereon to enclose the center portion.

A gain adjusting button of the selected color may be disposed at the center portion of the color gain adjusting window, but omitted in some cases.

Moreover, color bars disposed on the periphery portion of the color gain adjusting window may include a red bar, a green bar and a blue bar, which are spaced apart from each other in a predetermined distance.

Here, the color bars located between the red bar and the green bar may have intermediate colors characterized in that, if the color bars get farther from the red bar, an increasing rate of a unique R value decreases but an increasing rate of a unique G value increases.

And, the color bars located between the green bar and the blue bar may have intermediate colors characterized in that, if the color bars get farther from the green bar, an increasing rate of a unique G value decreases but an increasing rate of a unique B value increases.

Moreover, the color bars located between the blue bar and the red bar may have intermediate colors characterized in that, if the color bars get farther from the blue bar, an increasing rate of a unique B value decreases but an increasing rate of a unique R value increases.

Subsequently, the digital device checks whether a prescribed color is selected from the color gain adjusting window. [S30].

If the prescribed color is selected from the color gain adjusting window, the digital device extracts each of unique R, G and B values of the selected color [S40].

Here, when extracting the unique R, G and B values of the selected color, the digital device can extract a unique R value, a unique G vale and a unique B value corresponding to the selected color from the memory 520 having the values stored therein.

Then, the digital device checks whether a second input is received from the color gain adjusting window [S50].

here, the second input is a user input for selecting a color of the color gain adjusting window or adjusting a gain of a color, and may include a user input of touching & dragging a predetermined region of the color gain adjusting window in a specific direction or a user input of selecting a specific touch button.

Subsequently, if receiving the second input from the color gain adjusting window, the digital device can increase or decrease the extracted unique R, G and B values in response to the second input [S60].

Here, the digital device can increase or decrease the extracted unique R, G and B values at the same rate each time the second input is received.

For example, if the unique R, G and B values of the orange color are 1, 0.5 and 0, respectively and if each of R, G and B gain values of the orange color is 100, the digital device extracts 1, 0.5 and 0, which are the unique R, G and B values for the orange color, from the memory.

If the increase button 832 in the gain adjusting button of the color gain adjusting window 800 is selected once, the digital device places each of 1, 0.5 and 0, which are the extracted unique R, G and B values for the orange color, in the buffer.

Subsequently, if the increase button 832 in the gain adjusting button of the color gain adjusting window 800 is selected once more, the digital device increases the unique R value of the orange color located in the buffer from 1 to 2, increases the unique G value from 0.5 to 1, and maintains the unique B value as 0.

Namely, each time the gain increase button is selected, the digital device can increase each of the unique R, G and B values of the orange color at the same rate.

Subsequently, the digital device checks whether at least one of the increased unique R, G and B values is equal to or greater than a first reference value or equal to or smaller than a second reference value [S70].

If at least one of the increased unique R, G and B values is equal to or greater than the first reference value, the digital device increases a gain value of the corresponding color. If at least one of the decreased unique R, G and B values is equal to or smaller than the second reference value, the digital device decreases a gain value of the corresponding color [S80].

For example, if at least one of the increased unique R, G and B values is equal to or greater than 1, the digital device increases a gain value of the corresponding color. If at least one of the decreased unique R, G and B values is equal to or smaller than 0, the digital device decreases a gain value of the corresponding color.

Here, the first and second reference values can be set in advance by considering unique R, G and B values and a gain value of a color.

For example, if the unique R value of the orange color located in the buffer is increased from 1 to 2, the unique G value is increased from 0.5 to 1, and the unique B value is maintained as 0, since the increased unique R value '2' is equal to or greater than a reference value '1', the R gain value of the orange color is increased to 102 from 100. As the increased unique G value '1' is equal to or greater than the reference value '1', the G gain value of the orange color is increased to 101 from 100. As the unique B value '0' is not equal to or greater than the reference value '1', the B gain value of the orange color is maintained from 100 to 100.

Therefore, if calibration of a display screen is adjusted in a manner of increasing the R gain value of the orange color to 102, increasing the G gain value of the orange color to 101, and maintaining the B gain value of the orange color as 100, the digital device 600 can display an image in which the orange color is stronger than the previous.

Finally, if receiving an end request of the color gain adjustment, the digital device ends the color gain adjustment [S90].

Thus, the present invention can provide a user environment capable of increasing or decreasing a color gain value selected through a color gain adjusting window.

And, the present invention can provide user convenience capable of adjusting a color gain value by comparing a color of a current screen with a color to adjust through a color gain adjusting window.

Moreover, the present invention can provide user convenience capable of adjusting a color gain value of another digital device remotely through a color gain adjusting window of a mobile terminal.

It will be apparent to those skilled in the art that various modifications and variations can be made therein without departing from the spirit and scope of the invention.

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller of the terminal.

Therefore, this description is intended to be illustrative, and not to limit the scope of the claims. Thus, it is intended that the present invention covers the modifications and variations of this invention provided they come within the scope of the appended claims and their equivalents.

MODE FOR INVENTION

Various embodiments are described in BEST MODE FOR INVENTION for implementing the present invention.

INDUSTRIAL APPLICABILITY

The present invention is used for the fields related to a digital device capable of providing uniform color to a whole screen.

It will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A digital device, comprising:
an input unit comprising at least one of a touch screen, a keypad, a dome switch, a touchpad, a jog wheel, or a jog switch;
a display unit displaying a color gain adjusting window having a multitude of colors arrayed thereon; and
a controller operably coupled with the input unit and the display unit and controlling the input unit and the display unit,
wherein the controller is configured to:
cause the display unit to display the color gain adjusting window in response to a first input received via the input unit;
extract each of unique R, G and B values of the selected a color selected from the color gain adjusting window;
add or subtract the extracted unique R, G and B values to or from R, G and B buffers, respectively, in response to a second input received via the color gain adjusting window;
increase a gain value of the color when at least one of accumulated values of the R, G and B buffers is equal to or greater than '1'; and
decrease a gain value of the color when at least one of accumulated values of the R, G and B buffers is equal to or less than '0'.

2. The digital device of claim 1, wherein the display unit comprises a multi-display configuring a single screen in a manner that a multitude of display panels are arrayed and wherein the controller adjusts calibration of each of the display panels based on the gain value of the color increased or decreased through the color gain adjusting window.

3. The digital device of claim 1, wherein the second input comprises either an input of touching and dragging a predetermined region of the color gain adjusting window in a specific direction or an input of selecting a specific touch button.

4. The digital device of claim 3, wherein:
when the second input is the input of touching and dragging and comprises rotating in a first direction along a predetermined region of the color gain adjusting window, the controller increases the gain value of the color by adding at least one of the extracted unique R, G and B values to the R, G and B buffers, respectively; and
when the second input is the input of touching and dragging and comprises rotating in a second direction along a predetermined region of the color gain adjusting window, the controller decreases the gain value of the color by subtracting at least one of the extracted unique R, G and B values from the R, G and B buffers, respectively.

5. The digital device of claim 3, wherein:
when the second input is the input of selecting the specific touch button and comprises selecting an increase button of the color gain adjusting window, the controller increases the gain value of the color by adding at least one of the extracted unique R, G and B values to the R, G and B buffers, respectively; and when the second input is the input of the selecting the specific touch button and comprises selecting a decrease button of the color gain adjusting window, the controller decreases the gain value of the color by subtracting at least one of the extracted unique R, G and B values from the R, G and B buffers, respectively.

6. The digital device of claim 1, wherein the color gain adjusting window comprises:
a center portion displaying the selected color; and
a periphery portion having a multitude of color bars arrayed thereon to enclose the center portion.

7. The digital device of claim 6, wherein the controller is further configured to cause the display unit to display a color corresponding to a color bar selected from the color bars on the center portion.

8. The digital device of claim 6, wherein a gain adjusting button of the selected color is disposed on the center portion.

9. The digital device of claim 6, wherein:
the controller simultaneously increases color concentrations of the center and periphery portions of the color gain adjusting window in response to an input of moving in a first direction along the periphery portion of the color gain adjusting window; and
the controller simultaneously decreases color concentrations of the center and periphery portions of the color gain adjusting window in response to an input of moving in a second direction along the periphery portion of the color gain adjusting window.

10. The digital device of claim 6, wherein:
the controller increases a color concentration of the center portion of the color gain adjusting window only in response to an input of moving in a first direction along the periphery portion of the color gain adjusting window; and
the controller decreases a color concentration of the center portion of the color gain adjusting window only in response to an input of moving in a second direction along the periphery portion of the color gain adjusting window.

11. A color control system, comprising:
a remote control device calculating and sensing a gain value of a prescribed color through a color gain adjusting window having a multitude colors arrayed thereon, the remote control device comprising a mobile terminal, a remote controller, a smartphone, or a smartwatch; and
a digital device comprising a display unit and adjusting calibration of a display panel according to a color gain value received from the remote control device,
wherein the remote control device displays the color gain adjusting window on a display of the remote control device in response to a first input,
wherein the remote control device extracts each of unique R, G and B values of a color selected from the color gain adjusting window,
wherein the remote control device adds or subtracts the extracted unique R, G and B values to or from R, G and B buffers, respectively, in response to a second input received via the color gain adjusting window,
wherein the remote control device increases a gain value of the color when at least one of accumulated values of the R, G and B buffers is equal to or greater than '1',
wherein the remote control device decreases a gain value of the corresponding color when at least one of accumulated values of the R, G and B buffers is equal to or less than '0', and
wherein the remote control device sends the increased or decreased gain value of the color to the digital device.

12. The color control system of claim 11, wherein the first input comprises one of a remote control signal of an external device requesting to display the color gain adjusting window, a touch signal of a specific touch button, and a switching signal of a specific switch button.

13. The color control system of claim 11, wherein the second input comprises one of a user input of touching and dragging a predetermined region of the color gain adjusting window in a specific direction and a user input of selecting a specific touch button.

14. The color control system of claim 13, wherein:
when the second input is the user input of touching and dragging and comprises rotating in a first direction along a predetermined region of the color gain adjusting window, the remote control device increases the gain value of the corresponding color by adding at least one of the extracted unique R, G and B values to the R, G and B buffers, respectively, and
when the second input is the user input of touching and dragging and comprises rotating in a second direction along the predetermined region of the color gain adjusting window, the remote control device decreases the gain value of the corresponding color by subtracting at least one of the extracted unique R, G and B values from the R, G and B buffers, respectively.

15. The color control system of claim 13, wherein:
when the second input is the user input of selecting the specific touch button and comprises selecting an increase button of the color gain adjusting window, the remote control device increases the gain value of the corresponding color by adding at least one of the extracted unique R, G and B values to the R, G and B buffers, respectively, and
when the second input is the user input of selecting the specific touch button and comprises selecting a decrease button of the color gain adjusting window, the remote control device decreases the gain value of the corresponding color by subtracting at least one of the extracted unique R, G and B values from the R, G and B buffers, respectively.

16. The color control system of claim 11, wherein when each of the extracted unique R, G and B values is added to or subtracted from the R, G and B buffers, respectively, each time the second input is received, the remote control device adds or subtracts the extracted unique R, G and B values to or from the R, G and B buffers, respectively, at a same rate.

17. The color control system of claim 11, wherein:
when the gain value of the color is increased and at least one of the increased unique R, G and B values is equal to or greater than 1, the remote control device increases the gain value of the color; and
when the gain value of the color is decreased and at least one of the decreased unique R, G and B values is equal to or less than 0, the remote control device decreases the gain value of the color.

18. A color control method, comprising:
checking whether a first input is received;
when the first input is received via an input unit comprising at least one of a touch screen, a keypad, a dome switch, a touchpad, a jog wheel, or a jog switch, displaying, on a display unit, a color gain adjusting window having a multitude of colors arrayed thereon;
checking whether a prescribed color is selected from the color gain adjusting window;

extracting each of unique R, G and B values of the selected color in response to selection of a color from the color gain adjusting window;

checking whether a second input is received from the color gain adjusting window;

adding or subtracting the extracted unique R, G and B values to or from R, G and B buffers, respectively, in response to the second input;

checking whether at least one of accumulated values of the R, G and B buffers is equal to or greater than '1' or equal to or less than '0';

when the at least one of accumulated values of the R, G and B buffers is equal to or greater than '1', increasing a gain value of the color; and when the at least one of the accumulated values of the R, G and B buffers is equal to or less than '0', decreasing the gain value of the color.

19. The color control method of claim 18, wherein the adding or subtracting the extracted unique R, G and B values to or from the R, G and B buffers, respectively, in response to the second input comprises adding or subtracting the extracted unique R, G and B values to or from the R, G and B buffers, respectively, at a same rate each time the second input is received.

* * * * *